(12) United States Patent
Deuchar

(10) Patent No.: US 12,198,102 B2
(45) Date of Patent: Jan. 14, 2025

(54) DIGITAL RECRUITMENT SYSTEMS AND METHODS THEREOF

(71) Applicant: Verb Group Pty Ltd, Ardross (AU)

(72) Inventor: Paul Deuchar, Ardross (AU)

(73) Assignee: VERB GROUP PTY LTD, Ardross (AU)

( * ) Notice: Subject to any disclaimer, the term of this patent is extended or adjusted under 35 U.S.C. 154(b) by 253 days.

(21) Appl. No.: 17/782,956

(22) PCT Filed: Dec. 3, 2020

(86) PCT No.: PCT/AU2020/051324
§ 371 (c)(1),
(2) Date: Jun. 6, 2022

(87) PCT Pub. No.: WO2021/108864
PCT Pub. Date: Jun. 10, 2021

(65) Prior Publication Data
US 2022/0343285 A1  Oct. 27, 2022

(30) Foreign Application Priority Data
Dec. 4, 2019 (AU) .................................. 2019904593

(51) Int. Cl.
*G06Q 10/1053* (2023.01)
*H04N 7/14* (2006.01)

(52) U.S. Cl.
CPC .......... *G06Q 10/1053* (2013.01); *H04N 7/147* (2013.01)

(58) Field of Classification Search
CPC ............. G06Q 10/1053; G06Q 10/105; G06Q 30/018; H04N 7/147
See application file for complete search history.

(56) References Cited

U.S. PATENT DOCUMENTS

| 2007/0088601 A1* | 4/2007 | Money | G06Q 10/1053 |
| | | | 705/321 |
| 2013/0226578 A1* | 8/2013 | Bolton | G10L 15/22 |
| | | | 704/235 |

(Continued)

OTHER PUBLICATIONS

SparkHire.com, https://web.archive.org/web/20190520161638/https://www.sparkhire.com/tour (Year: 2019).*

(Continued)

*Primary Examiner* — Florian M Zeender
*Assistant Examiner* — Emily M. Kraisinger
(74) *Attorney, Agent, or Firm* — Fresh IP PLC; Clifford D. Hyra; Aubrey Y. Chen

(57) ABSTRACT

A digital recruitment system and a method to enable a candidate to create, edit, upload a multimedia comprising a job application comprising video, audio etc. in one or more sections to apply for a job is provided. Further, the system allows the candidate and recruiter(s) to exchange information with each other via videos (or multimedia), video chats, audio chats, etc. The system protects a job application and/or a multimedia response from the recruiter from editing by a third person other than an owner, wherein the candidate is the owner of the job application and the recruiter is the owner of the multimedia response. The system may embed time and location information into the multimedia; therefore, the system allows the users (candidate and recruiters) to generate authentic multimedia. Further, the system may augment more information in the multimedia automatically or based on an input from the owner of the multimedia.

25 Claims, 5 Drawing Sheets

(56) References Cited

U.S. PATENT DOCUMENTS

| | | | |
|---|---|---|---|
| 2014/0229396 A1* | 8/2014 | Sack | G06Q 10/1053 |
| | | | 705/321 |
| 2017/0270550 A1 | 9/2017 | Cooper | |
| 2018/0060823 A1* | 3/2018 | Garimella | G06Q 10/1053 |
| 2018/0157995 A1* | 6/2018 | O'Malley | G06Q 10/1053 |
| 2019/0114593 A1* | 4/2019 | Champaneria | G06F 16/3326 |
| 2019/0295040 A1 | 9/2019 | Clines | |

OTHER PUBLICATIONS

International Search Report for PCT/AU2020/051324, Mailing Date Feb. 3, 2021.
Written Opinion for PCT/AU2020/051324, Mailing Date Feb. 3, 2021.

* cited by examiner

DIGITAL RECRUITMENT SYSTEMS AND METHODS THEREOF

TECHNICAL FIELD

The presently disclosed subject matter generally relates to the field of information processing and sharing systems. Particularly, the present subject matter relates to video-based digital recruitment systems and methods for enabling a candidate to create and share a job application including a multimedia comprising information for applying for a job opportunity with one or more recruiters. The information may include such as, but not limited to, a cover letter information, a resume information, interview, and negotiation information.

BACKGROUND

Any references to methods, apparatus or documents of the prior art are not to be taken as constituting any evidence or admission that they formed, or form part of the common general knowledge.

There has been a marked shift in the last decade, where employment is moving away from that of career employment, towards that of contracting and shorter-term jobs. This in turn is increasing the rate of hiring significantly. Currently, substantial time is invested in the recruitment process by both potential employees and employers. This large investment in time has historically been justifiable when the recruitment process is linked to long term job opportunities. In particular, inefficiencies exist with respect to the preparation and review process associated cover letters, which may subsequently result in interviews being conducted. In a job market that is shifting towards shorter term employment, contracts, and roles, these inefficiencies represent a significant opportunity cost to both potential employees and employers.

Recruitment consultants with industry experts has concluded that interviews provide more succinct and relevant information on potential employee candidates than cover letters of the potential employee candidates during a recruitment process. However, the interview process is time consuming, and as a result, currently cannot replace the need for an initial screening process via review of the cover letters.

Currently, human resource (HR) offerings rely on a classified system (e.g. online or offline i.e. printed job advertisements) that relies on candidates to apply and submit a resume or Curriculum Vitae ("CV") and/or a cover letter and then the recruitment consultant or the employer may manually go through the CV's and cover letters to find an appropriate candidate or to create a short list of potential candidates. The problem with the current system is that the ability for the recruitment consultant or employer to efficiently assess candidates to find the "right fit" is limited due to the use of words and the time-consuming nature of this process. Another problem with the current system is that it is a lot easier for candidates to set out their academic and experience in writing than it is for them to honestly convey their personality and attitude.

US 2018/0060823 A1 discloses a method to provide a job board for job management by job seekers or users such as a recruiter of a company or an account manager or an administrator. US 2018/0060823 A1 provides a job board for automatic management job management where the users such as can create and post job requirements, receive profiles from job seekers and process the profiles. The job board may be used by the users for hiring and tracking job applications. The US 2018/0060823 A1 discloses a video profile recording option to allow a job seeker to record a video profile of a pre-defined duration (for example 1-minute video profile) from the profile setup page. The video profile can help recruiters to quickly analyse the job seeker's communication skills, confidence, proactive approach, etc., in turn helping the job seeker's chances of impressing a recruiter. The D1 document does not disclose displaying the job application of a job seeker along with augmented data on the recruiter interface. Also, in US 2018/0060823 A1, there is no mention of performing sentiment analysis to determine an interest level of the candidate (i.e. job seeker) and the recruiter. Further, the systems and methods of US 2018/0060823 A1 does not enable users to provide feedback. But the method of US 2018/0060823 A1 does not allow the job seekers to review, edit, re-record, and combine one or more sections of the video profile prior to submitting to the recruiter. Further, the method of US 2018/0060823 A1 does not disclose video cover letters.

US 2014/0229,396 A1 discloses a web-based system and method for providing applicant specific premium candidate profiles to potential employers. The US 2014/0229,396 A1 also discloses augmenting the premium candidate profile with premium profile information points. Further, the US 2014/0229,396 A1 mentions video profiles to allow employers to view the candidate, their body language, their speech quality, and other physical elements that would otherwise be unascertainable via a written profile alone. However, the US 2014/0229,396 A1 does not discuss automatically analysing the job application (i.e. premium profile information points) and the at least one multimedia response by performing sentiment analysis to determine an interest level of the candidate and the recruiter. US 2014/0229,396 A1 also fails to disclose providing a first feedback about the job application to the recruiter and a second feedback about the at least one multimedia response to the candidate. The system or method of US 2014/0229,396 A1 doesn't allow candidates to fix or correct videos so it may sometimes avoid the candidates from providing the best of their information and there is no way of identifying if the video profile received from the candidate is authentic.

US 2019/0295040 A1 discloses a web-based employment networking system (ENC). The ENC system facilitates an employment filtering community allowing job seekers to register in the front office of the system and market themselves to potential employers, while employers are allowed to register in the back office of the system, granting the access to filtered prospective employee submitted data and exclusive access to a rating system defined by other fellow employers of every registered employee/job seeker employed by them in the past. The ENC System contains a video uploading function, designed to provide the job seeker a tool to further market themselves to the Employer(s). the ENC system also provides a "Video chat/voice call services" function to the employer to allow initial interviews to be conducted via the ENC's embedded system. The US 2019/0295040 A1 does not disclose displaying the job application along with augmented data on the recruiter interface. Further, the ENC system of US 2019/0295040 A1 may not enable the job seeker or the recruiter to provide a feedback about the job application. US 2019/0295040 A1 discloses the video upload function but it doesn't allow the users to edit the video or make the video authentic. This means the uploaded videos can be manipulated by any user who has access to the video. For example, the video uploaded by a job seeker for a recruiter can be edited by the recruiter and the edited video may not represent the job seeker accurately.

US 2017/0270550 A1 discloses a system for recruitment and employment services by implementing multiple dashboards or user interfaces for recruiter, candidate, partner recruiter, employer, commission calculation, analytics, timesheets, and payroll. Further, US 2017/0270550 A1 discloses enabling a job seeker to register in the system and create a profile and to contemporaneously or subsequently augment their profile with availability data, compensation rates, qualifications and skills, resumes and candidate videos. The system disclosed in US 2017/0270550 A1 does not provide the feature of automatically analysis the job application and the video response of the recruiter by performing sentiment analysis to determine an interest level of the candidate and the recruiter, respectively. Further, the system of US 2017/0270550 A1 does not enable the recruiter to provide a feedback about the job application of the job seeker. But it doesn't provide any means for authenticating the information such as video or profile of the job seeker.

In light of above discussion, there exists a need for improved and efficient techniques for information sharing during a recruitment process.

SUMMARY

To overcome the above-mentioned limitations and problems, the present disclosure provides a digital recruitment system and a method for enabling a candidate create a multimedia comprising a video in one or more sections to apply for a job via the multimedia. The multimedia for applying a job may enable a more real representation of the candidate to be presented to a recruiter such as, but not limited to, a recruitment consultant, a hiring manager, or an employer. The candidate can edit the one or more sections and combine the one or more sections in any order to create the video. The digital recruitment system may be a mobile application running on a computing device like a smart phone of a user, or the digital recruitment system may be accessed by entering a uniform resource link (URL) in a browsing application on the computing device like a smart phone.

An object of the present disclosure is to provide a digital recruitment system and a method to enable a candidate to create, edit, upload a multimedia comprising a job application comprising video, audio etc. in one or more sections to apply for a job is provided. Further, the system allows the candidate and recruiter(s) to exchange information with each other via videos (or multimedia), video chats, audio chats, etc. The system protects a job application and/or a multimedia response from the recruiter from editing by a third person other than an owner, wherein the candidate is the owner of the job application and the recruiter is the owner of the multimedia response. The system may embed time and location information into the multimedia; therefore, the system allows the users (candidate and recruiters) to generate authentic multimedia or job application. Further, the system may augment more information in multimedia (or job application) automatically or based on an input from the owner of the multimedia.

An embodiment of the present disclosure provides a digital recruitment system (hereinafter referred as a system) for enabling a plurality of candidates to share information with one or more recruiters in a recruitment process. The system includes a display device configured to present a user interface to a plurality of users comprising the plurality of candidates and the one or more recruiters. The plurality of candidates is presented with a job seeker interface and the one or more recruiters are presented with a recruiter interface. The system also includes a registration device configured to enable the plurality of users to register with the recruitment system, wherein the one or more recruiters posts one or more job opportunities through at least one of the recruiter interface and one or more job publishing platforms. The plurality of candidates searches and applies for the one or more job opportunities through the job seeker interface. The system also includes a multimedia device configured to enable a candidate of the plurality of candidates to create a job application comprising at least one multimedia comprising one or more sections for applying to at least one job opportunity, wherein the candidate creates the job application by at least one of creating and attaching an information file, recording, reviewing, editing, re-recording, and combining the one or more sections comprising at least one of a video, an audio, an image, a text message, a live chat message, an automatic message, and the information file. The multimedia device may enable a recruiter to create at least one multimedia response comprising at least one section for interacting with the candidate by at least one of recording, reviewing, editing, re-recording, and combining the at least one section comprising at least one of a video, an audio, an image, an automatic message, a live chat message, a text message, and an information file. The multimedia device may protect the job application and the at least one multimedia response from editing by a third person other than an owner, wherein the candidate is the owner of the job application and the recruiter is the owner of the at least one multimedia response. The system also includes a communication device configured to facilitate communication between the candidate and the recruiter by: allowing the candidate to send the job application to the recruiter via the job seeker interface, wherein the display device displays the job application along with augmented data on the recruiter interface of the recruiter, the recruiter reviews the job application and the augmented data through the recruiter interface; and enabling the candidate to receive the at least one multimedia response from the recruiter. The recruiter sends the at least one multimedia response to assess the candidate based on the job application during a recruitment process.

According to an aspect of the present disclosure, the digital recruitment system further comprises a search device configured to: enable the plurality of candidates to perform an augmented screen-based search for the one or more job opportunities based on a location, an image, a live camera feed, and a video through the job seeker interface; and enable the one or more recruiter to perform an augmented screen-based search for at least one candidate suitable for the one or more job opportunities based on a location, an image, a live camera feed, and a video through the recruiter interface.

According to an aspect of the present disclosure, the multimedia device is further configured to: automatically analyse the job application and the at least one multimedia response by performing sentiment analysis to determine an interest level of the candidate and the recruiter, respectively; provide a first feedback about the job application to the recruiter and a second feedback about the at least one multimedia response to the candidate, respectively based on the analysis; enable the candidate to process the at least one multimedia according to one or more pre-defined conditions defined by at least one of the recruiter and the one or more job publishing platforms; and enable the candidate to create the at least one multimedia and the recruiter to create the at least one multimedia response of a pre-defined duration by recording, reviewing and editing prior to uploading or sending.

According to another aspect of the present disclosure, the digital recruitment system also includes an integration device configured to integrate the digital recruitment system with the one or more job publishing platforms to enable the plurality of users to access the one or more job publishing platforms directly through the digital recruitment system.

In some embodiments, the candidate accesses the digital recruitment system on a first computing device, wherein the recruiter accesses the digital recruitment system on a second computing device.

In some embodiments, the job application comprises a personal job application video comprising at least one of curriculum vitae (CV) information of the candidate, cover letter information of the candidate, an interview, and negotiation information.

In some embodiments, the job application and the at least one multimedia response are stored and is available for viewing and processing for a pre-defined time, further wherein the at least one multimedia and the at least one multimedia response are temporary multimedia and expires after the pre-defined time, In some embodiments, the cover letter information comprises video cover letter and is uneditable by any person other than the candidate.

In some embodiments, the job application comprising the cover letter includes at least one of a timestamp and location information.

According to an aspect of the present disclosure, the display device is further configured to display the job application on the recruiter interface, the recruiter interface comprising at least three sections comprising a multimedia section for displaying the received job application, a live messaging section for allowing live communication between the recruiter and the candidate, and a notes section for allowing the recruiter to write notes based on the review of the job application of the candidate, the recruiter interface further comprises a shortlists section to allow the recruiter to shortlist one or more candidates for the job opportunities, the recruiter interface also comprises one or more action options to allow the recruiter to take one or more action based on the review of the job application.

According to another aspect of the present disclosure, the display device is further configured to provide one or more communication options comprising an automate option and a broadcast option to the recruiter for communicating with the plurality of candidates who applied to the one or more job opportunities, wherein the automate option allows the recruiter to send one or more messages to a selected list of candidates, wherein the broadcast option allows the recruiter to broadcast a message to the plurality of candidates.

According to another aspect of the present disclosure, the digital recruitment system also includes a database configured to store a visual guide comprising one or more instructions for using the digital recruitment system and creating and sharing the multimedia, registration information, candidates' information, recruiters' information, job opportunities' information, the one or more sections, the at least one section, the job applications comprising the multimedia, shortlisted job applications, and multimedia responses.

In some embodiments, the registration device is further configured to authenticate at least one of an identity and a location of the plurality of candidates and the one or more recruiters registered with the digital recruitment system.

In some embodiments, the communication device is configured to send the one or more messages to at least one of the selected candidates and the plurality of candidates based on a selection of at least one of the automate option and the broadcast option by the recruiter; and automatically initiate a conversation with the candidate by asking pre-defined questions set by the recruiter for the plurality of candidates in accordance with the job opportunity when the candidate initiates a job application process through the job seeker interface.

Another embodiment of the present disclosure provides a method for enabling a plurality of candidates to share information with one or more recruiters in a recruitment process. The method includes presenting, by a display device, a user interface to a plurality of users comprising the plurality of candidates and the one or more recruiters, wherein the plurality of candidates is presented with a job seeker interface and the one or more recruiters are presented with a recruiter interface. The method also includes enabling, by a registration device of a digital recruitment system, the plurality of users to register with the digital recruitment system, wherein the one or more recruiters posts one or more job opportunities through at least one of the recruiter interface and one or more job publishing platforms. The plurality of candidates may apply for the one or more job opportunities through the job seeker interface. The method also includes enabling, by a multimedia device of the digital recruitment system, a candidate of the plurality of candidates to create a job application comprising at least one multimedia comprising one or more sections for applying to at least one job opportunity. The candidate creates the job application by at least one of creating and attaching an information file, recording, reviewing, editing, re-recording, and combining the one or more sections comprising at least one of a video, an audio, an image, a text message, a live chat message, an automatic message, and the information file. The method also includes enabling, by the multimedia device, a recruiter to create at least one multimedia response comprising at least one section for interacting with the candidate. The recruiter may create the at least one multimedia response by at least one of recording, reviewing, editing, re-recording, and combining the at least one section comprising at least one of a video, an audio, an image, an automatic message, a live chat message, a text message, and an information file. The method also includes protecting, by the multimedia device, the job application and the at least one multimedia response from editing by a third person other than an owner, wherein the candidate is the owner of the job application and the recruiter is the owner of the at least one multimedia response. Further, the method includes facilitating, by a communication device of the digital recruitment system, communication between the candidate and the recruiter by: allowing the candidate to send the job application to the recruiter via the job seeker interface, wherein the job application along with augmented data is displayed on the recruiter interface of the recruiter, the recruiter reviews the job application and the augmented data through the recruiter interface; and enabling the candidate to receive the at least one multimedia response from the recruiter on the first computing device, wherein the recruiter sends the at least one multimedia response to assess the candidate based on the job application during a recruitment process.

In some embodiments, the method also includes: enabling, by a search device, the plurality of candidates to perform an augmented screen-based search for the one or more job opportunities based on a location, an image, a live camera feed, and a video through the job seeker interface; and enabling, by a search device, the one or more recruiter to perform an augmented screen-based search for at least one candidate suitable for the one or more job opportunities based on a location, an image, a live camera feed, and a video through the recruiter interface.

The method may also include: performing the following by the display device: displaying the job application on the recruiter interface, the recruiter interface comprising at least three sections comprising a multimedia section for displaying the received job application, a live messaging section for allowing live communication between the recruiter and the candidate, and a notes section for allowing the recruiter to write notes based on the review of the job application of the candidate, the recruiter interface further comprises a shortlists section to allow the recruiter to shortlist one or more candidates for the job opportunities, the recruiter interface also comprises one or more action options to allow the recruiter to take one or more action based on the review of the job application; and providing one or more communication options comprising an automate option and a broadcast option to the recruiter for communicating with the plurality of candidates who applied with the one or more job opportunities, wherein the automate option allows the recruiter to send one or more messages to a selected list of candidates, wherein the broadcast option allows the recruiter to broadcast a message to the plurality of candidates.

The method may also include integrating, by an integration device, the digital recruitment system with the one or more job publishing platforms to enable the plurality of users to access the one or more job publishing platforms directly through the digital recruitment system.

The method may further include storing, in a database of the digital recruitment system, a visual guide comprising one or more instructions for using the digital recruitment system and creating and sharing the multimedia, registration information, candidates' information, recruiters' information, job opportunities' information, the one or more sections, the at least one section, the job applications comprising the multimedia, shortlisted job applications, and multimedia responses.

The method may further include authenticating, by the registration device, at least one of an identity and a location of the plurality of candidates and the one or more recruiters registered with the digital recruitment system.

The method may also include performing the following by the communication device: sending the one or more messages to at least one of the selected candidates and the plurality of candidates based on a selection of at least one of the automate option and the broadcast option by the recruiter; and automatically initiating a conversation with the candidate by asking pre-defined questions set by the recruiter for the plurality of candidates in accordance with the job opportunity when the candidate initiates a job application process through the job seeker interface.

A yet another embodiment of the present disclosure provides a video-based digital recruitment system (or system) for enabling a plurality of candidates to share information and interact with one or more recruiters in a recruitment process. The system includes a display device configured to present a user interface to a plurality of users comprising the plurality of candidates and the one or more recruiters, wherein the plurality of candidates is presented with a job seeker interface and the one or more recruiters are presented with a recruiter interface. The system also includes a registration device configured to enable the plurality of users to register with the recruitment system, wherein the one or more recruiters posts one or more job opportunities through at least one of the recruiter interface and one or more job publishing platforms. The plurality of candidates searches and applies for the one or more job opportunities through the job seeker interface. The system also includes a multimedia device configured to enable a candidate of the plurality of candidates to create a job application. The job application may include at least one multimedia comprising one or more sections for applying to at least one job opportunity. The candidate creates the job application by at least one of creating and attaching an information file, recording, reviewing, editing, re-recording, and combining the one or more sections comprising at least one of a video, an audio, an image, a text message, a live chat message, an automatic message, and the information file on a first computing device. The job application (or job application video) may include a personal job application video, an interview video, text messages, audio, negotiation video, cover letter information, CV information of a pre-defined duration. Further, the multimedia device is configured to enable a recruiter to create at least one multimedia response of a pre-defined duration comprising at least one section for interacting with the candidate by at least one of recording, reviewing, editing, re-recording, and combining the at least one section comprising at least one of a video, an audio, an image, an automatic message, a live chat message, a text message, and an information file on a second computing device. The multimedia device is further configured to protect the job application and the at least one multimedia response from editing by a third person other than an owner, wherein the candidate is the owner of the job application and the recruiter is the owner of the at least one multimedia response. The system also includes a communication device configured to facilitate communication between the candidate and the recruiter by: allowing the candidate to send the job application to the recruiter via the job seeker interface, wherein the display device displays the job application along with augmented data on the recruiter interface of the recruiter, the recruiter reviews the job application and the augmented data through the recruiter interface; and enabling the candidate to receive the at least one multimedia response from the recruiter, wherein the recruiter sends the at least one multimedia response to assess the candidate based on the job application during a recruitment process. Further, the system includes a search device configured to enable the plurality of candidates to perform an augmented screen-based search for the one or more job opportunities based on a location, an image, a live camera feed, and a video through the job seeker interface; and enable the one or more recruiter to perform an augmented screen-based search for at least one candidate suitable for the one or more job opportunities based on a location, an image, a live camera feed, and a video through the recruiter interface. Furthermore, the system includes an integration device configured to integrate the recruitment system with the one or more job publishing platforms to enable the plurality of users to access the one or more job publishing platforms directly through the video-based digital recruitment system. Furthermore, the system includes a database configured to store a visual guide comprising one or more instructions for using the digital recruitment system and creating and sharing the multimedia, registration information, candidates' information, recruiters' information, job opportunities' information, the one or more sections, the at least one section, the job applications comprising the multimedia, shortlisted job applications, and multimedia responses.

In some embodiments, the multimedia device allows the candidate to create a cover letter or a video cover letter. The video cover letters are authentic cover letter as they are un-editable by any other person than the owner of the video cover letter, and also includes timestamp and/or location information. In some embodiments, the video cover letter is a short video showing off candidate's personality and skills to prospective recruiters or hiring managers. Further, the multimedia device may automatically embed location and timestamp information into the video cover letter that may prove an authenticity of the video cover letter. In some embodiments, the multimedia device enables the candidate to create the video cover letter comprising at least one section by at least one of creating and attaching an information file, recording, reviewing, editing, re-recording, and combining the at least one section. The at least one section may include a video, an audio, an image, a text message, a live chat message, an automatic message, an information file, and so forth. The multimedia device may make the video cover letters authentic by automatically adding location and/or timestamp information and adding some security options such as, but nor limited to, adding password security, making the cover letters uneditable by anyone else other than the owner of the cover letters, and so forth. In some embodiments, the multimedia device also provides options to the candidate to allow how the job application or the video cover letter is accessed by the receiver of the same. The options may include such as a forwarding permission for allowing the receiver to share information (e.g. the job application, video resume, video cover letter etc.) of the candidate with others (e.g. other recruiters, managers, etc.), an editing permission for allowing (or restricting) the receiver for making any changes in the job application and so forth.

Another embodiment of the present disclosure provides a non-transitory computer-readable storage medium enabling a plurality of candidates to share information with one or more recruiters in a recruitment process, when executed by a computing device, cause the computing device to: presenting, by a display device, a user interface to a plurality of users comprising the plurality of candidates and the one or more recruiters, wherein the plurality of candidates is presented with a job seeker interface and the one or more recruiters are presented with a recruiter interface; enabling, by a registration device of a digital recruitment system, the plurality of users to register with the digital recruitment system, wherein the one or more recruiters posts one or more job opportunities through at least one of the recruiter interface and one or more job publishing platforms, wherein the plurality of candidates applies for the one or more job opportunities through the job seeker interface; enabling, by a multimedia device of the digital recruitment system, a candidate of the plurality of candidates to create a job application comprising at least one multimedia comprising one or more sections for applying to at least one job opportunity, wherein the candidate creates the job application by at least one of creating and attaching an information file, recording, reviewing, editing, re-recording, and combining the one or more sections comprising at least one of a video, an audio, an image, a text message, a live chat message, an automatic message, and the information file; enabling, by the multimedia device, a recruiter to create at least one multimedia response comprising at least one section for interacting with the candidate, wherein the recruiter creates the at least one multimedia response by at least one of recording, reviewing, editing, re-recording, and combining the at least one section comprising at least one of a video, an audio, an image, an automatic message, a live chat message, a text message, and an information file; allowing the candidate to send the job application to the recruiter via the job seeker interface, wherein the job application along with augmented data is displayed on the recruiter interface of the recruiter, the recruiter reviews the job application and the augmented data through the recruiter interface; enabling the candidate to receive the at least one multimedia response from the recruiter on the first computing device, wherein the recruiter sends the at least one multimedia response to assess the candidate based on the job application during a recruitment process; protecting, by the multimedia device, the job application and the at least one multimedia response from editing by a third person other than an owner, wherein the candidate is the owner of the job application and the recruiter is the owner of the at least one multimedia response; enabling, by a search device, the plurality of candidates to perform an augmented screen-based search for the one or more job opportunities based on a location, an image, a live camera feed, and a video through the job seeker interface; and enabling, by a search device, the one or more recruiter to perform an augmented screen-based search for at least one candidate suitable for the one or more job opportunities based on a location, an image, a live camera feed, and a video through the recruiter interface.

Other and further aspects and features of the disclosure will be evident from reading the following detailed description of the embodiments, which are intended to illustrate, not limit, the present disclosure.

DETAILED DESCRIPTION

Preferred features, embodiments and variations of the invention may be discerned from the following detailed description which provides sufficient information for those skilled in the art to perform the invention. The detailed description is not to be regarded as limiting the scope of the preceding summary of the invention in any way.

The functional units described in this specification have been labelled as devices or modules. A device or module may be implemented in programmable hardware devices such as CPUs, tensor processors, field programmable gate arrays (FPGA), cloud computation units, distributed computation units, or the like. The devices and modules may also be implemented in software for execution by various types of processors. An identified device or module may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device. Furthermore, the described features, structures, or characteristics may be combined in any suitable manner in one or more embodiments.

Specific embodiments of the present disclosure are described, by way of example only, with reference to the accompanying drawings, in which.

The principal objective of the present disclosure is to provide systems and methods for improving the current industry standard process of recruitment. The present disclosure provides digital recruitment systems and methods for improving recruitment process by providing a personalized streamlined application and review process for recruiters and candidates. The systems and methods enable a new innovative style of multimedia (video) introduction and review. The nature of which is to be authentic content, focused and on point, removing the large blank or thinking periods present in traditional video medium to allow rapid on point and fair analysis during a recruitment process.

Figure 1A:
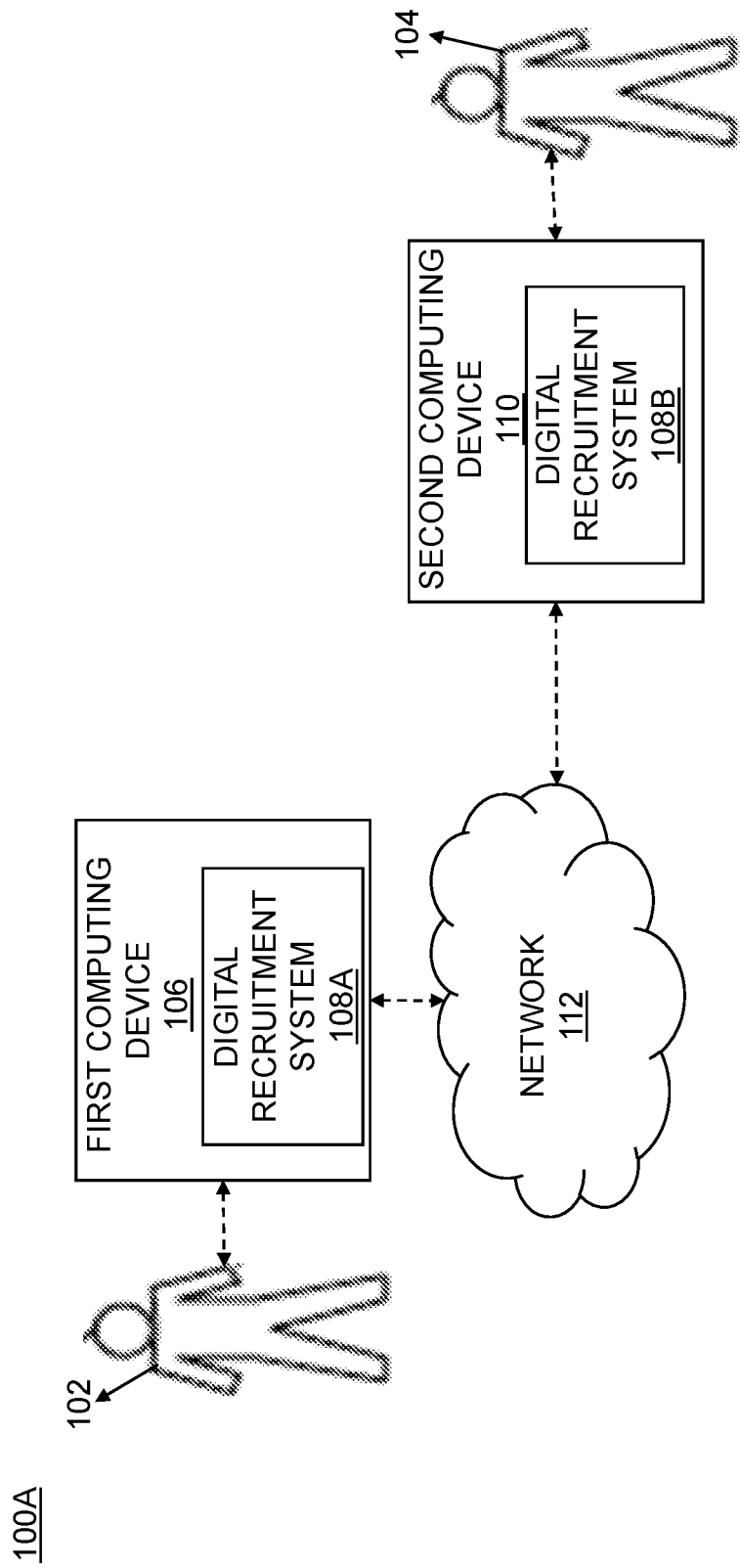
FIG. 1A is a schematic diagram illustrating an exemplary environment, where various embodiments of the present disclosure may function.

Referring to FIG. 1A, an exemplary environment 100A is shown where various embodiments of the present disclosure may function. The environment 100A includes a candidate 102 having an associated first computing device 106 including a digital recruitment system 108A. The environment 100A also includes a recruiter 104 having an associated second computing device 110 including a digital recruitment system 108B. The candidate 102 may be a user or a person interested in applying for a job opportunity through the digital recruitment system 108A. The recruiter 104 may be a user or a person who posts the job opportunity on one or more job publishing platforms. In some embodiments, the job publishing platforms may include online job portals, and offline job boards. The candidate 102 and the recruiter 104 may require to register with the digital recruitment systems 108A-108B, respectively. Hereinafter, the digital recruitment system may also be referred as recruitment system or system.

The first computing device 106 and the second computing device 110 are electronic devices having computational capability and are configured to connect to a network 112 for exchange of information in form of multimedia, audio message, text message, video message, images, and so forth. Examples of the first computing device 106 and the second computing device 110 may include, but are not limited to, a computer, a smart phone, a tablet computer, a smart television, a smart watch, a fitness tracker, a personal digital assistant, a laptop computer, and so forth. Further, each of the first computing device 106 and second computing device 110 may include a mic, one or more cameras, and a speaker.

The digital recruitment systems 108A-108B may include software, hardware, firmware, and combination of these. The digital recruitment system 108A is present on the first computing device 106 and the digital recruitment system 108B is present on the second computing device 110. In some embodiments, the candidate 102 and the recruiter 104 may install the respective digital recruitment system 108A, 108B on their associated first computing device 106 and second computing device 110, as a software application respectively. In some embodiments, the first computing device 106 and the second computing device 110 may not include the digital recruitment systems 108A-108B, respectively. For example, the candidate 102 have the digital recruitment system 108A on the first computing device 106 as a mobile application. Similarly, the recruiter 104 may have the digital recruitment system 108B on the second computing device 110 as a mobile application.

Figure 1B:
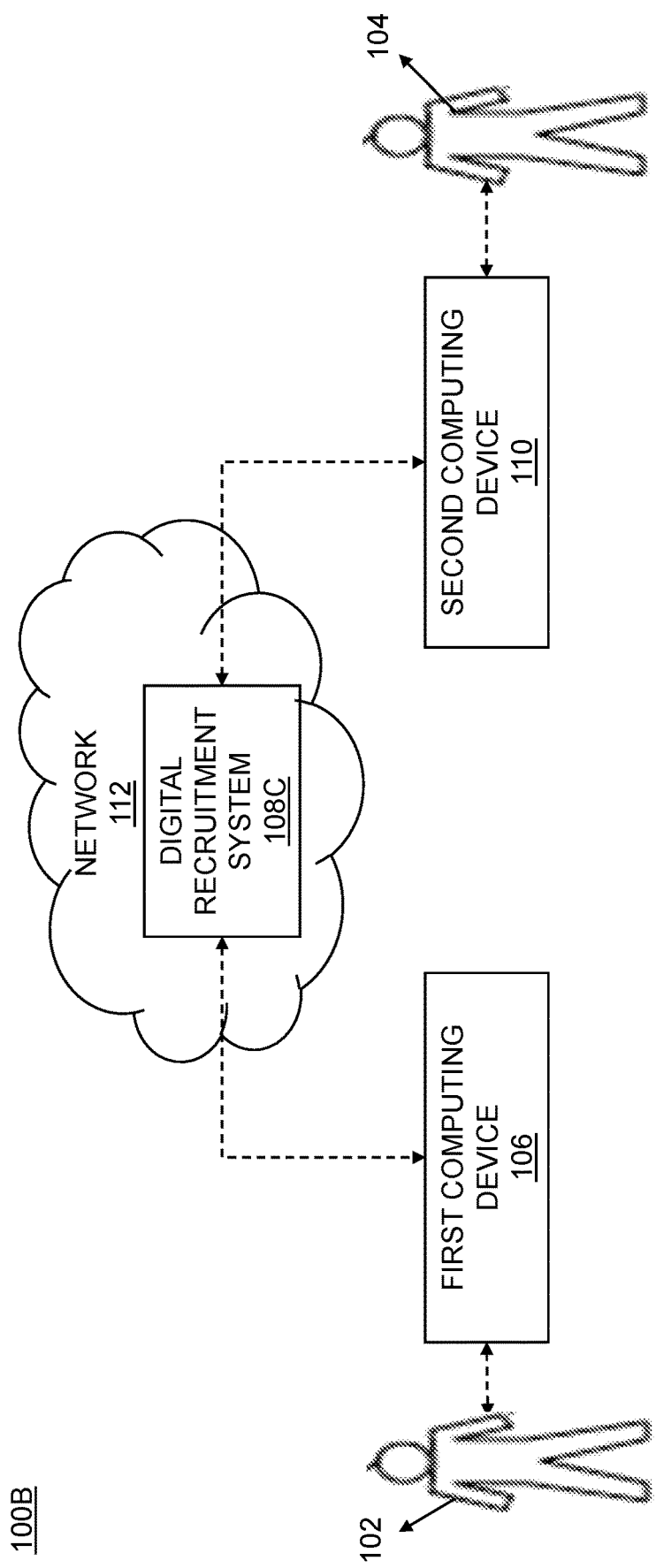
FIG. 1B is a schematic diagram illustrating another exemplary environment, where various embodiments of the present disclosure may function.

Referring to FIG. 1B, an environment 100B shows a digital recruitment system 108C located in the network 112. In some embodiments, the network 112 may be a cloud network. In such embodiments, the candidate 102 and the recruiter 104 may access the digital recruitment system 108C by connecting their respective computing devices 106 and 110 to the network 112. In an example, the candidate 102 and the recruiter 104 may access the digital recruitment system 108C by entering a uniform resource locator (URL) on a browsing application on their respective first computing device 106 and the second computing device 110. Examples of the browsing application may include, but are not limited to, Google Chrome, Firefox Mozilla, Microsoft Internet Explorer, Safari, and so forth.

Further, the digital recruitment system 108A, 108B and 108C are similar in functionality and structure. Hereinafter, the digital recruitment systems 108A, 108B, 108C may collectively be referred as the digital recruitment system 108. The candidate 102 and the recruiter 104 can register with the digital recruitment system 108A, 108B (or 108C), respectively, by providing one or more one or more credentials like a name, an email address, a birth date, a user name, a password, an address, a finger print scan, a face scan, and so forth. Post registration, the candidate 102 may enter his/her credentials for accessing the digital recruitment system 108B. Post registration, the recruiter 104 can access the digital recruitment system 108B (or 108C) by entering one or more credentials on the second computing device 110. The digital recruitment system 108 may receive the one or more credentials from the candidate 102 and/or the recruiter 104 for login, authenticate an identity of the candidate 102 and/or the recruiter 104 and provide access to the digital recruitment system 108 based on an authentication of the one or more credentials. The digital recruitment system 108 may authenticate at least one of an identity and a location of the plurality of candidates, such as the candidate 102, and the one or more recruiters, such as the recruiter 104, registered with the digital recruitment system 108.

The digital recruitment system 108 creates a profile for the candidate 102 and the recruiter 104 based on the registration. The digital recruitment system 108 enables a plurality of candidates such as the candidate 102 and one or more recruiters such as the recruiter 104 to register for accessing the recruitment system 108. The one or more recruiters may post one or more job opportunities on one or more job publishing platforms. The plurality of candidates may apply for the one or more job opportunities.

The digital recruitment system 108A (or 108C) presents a job seeker interface on the first computing device 106 for example on a display screen of the first computing device 106. The job seeker interface may include one or more options comprising such as, but not limited to, job searching options, data sharing options, multimedia recording/reviewing/editing options, job applying options, job shortlisting options, live messaging options, data storage options, job sharing options, feedback options, uploading options, data analyzing options, communication options, and so forth. The job searching options may allow the candidate 102 to search for a number of opportunities, and the data sharing options may allow the candidate 102 to share data such as files (document files, presentation files etc.) with other users like the recruiter 104. The multimedia recording/reviewing/editing options may allow the candidate 102 to record/review/edit a multimedia comprising video, audio, text, etc. The job applying options may allow the candidate 102 to apply for a job opportunity. The candidate 102 may apply for the job opportunity by sending at least one of a resume file e.g. a document file, a PDF file, and so forth, a multimedia cover letter, a multimedia, or by using a pre-defined template stored in the system 108A (or 108C) for applying for a job. The pre-defined template may be uploaded by the recruiter 104 while posting the job opportunity in some embodiments.

The job shortlisting options may allow the candidate 102 to shortlist one or more job opportunities that he/she may have liked, the live messaging options may allow the candidate 102 to have live communication with the recruiters for example, send text, video or audio messages to the recruiters. The data storage options allow the candidate 102 to store data such as, but not limited to, resume, cover letters, messages, chats, or other data, in the system 108A (or 108C). The job sharing options may allow the candidate 102 to share the job opportunity with other users for example via social media platforms, messaging services, and so forth. The feedback options enable the candidate 102 to receive or provide a feedback to other users like recruiters, companies, jobs, recruitment process, and so forth. The uploading options may allow the candidate to upload data or files, encrypt data and files prior to uploading etc. The data analyzing options may allow the candidate 102 to enable analysis of data by the system 108A (or 108C). For example, the system 108A (or 108C) may analyse a multimedia response from the recruiter 104 by using sentiment analysis methods or techniques to indicate that the recruiter 104 has liked candidate's job application or profile.

In some embodiments, the job seeker interface may include a job application creating interface to allow the candidate to create a job application by creating multimedia and/or attaching a file like a resume file and or include a message. The candidate 102 may store the job application for later use or may directly apply for a job opportunity through the job seeker interface. The job seeker interface may also include a live messaging interface to allow the job seeker to chat or interact with the recruiters in real-time. The candidate 102 may view a job summary showing details about the jobs applied by the candidate 102 in a time duration like daily, monthly, weekly, yearly. Further, the candidate 102 can switch on camera of the device 106 and point the camera towards a location or area, the system 108A may automatically determine the location of the area and present the candidate 102 with one or more job opportunities in that area. Further, the system 108A may enable the candidate 102 to connect directly with the recruiters of the job opportunities and apply for the same accordingly. The job seeker interface may enable the candidate 102 to interact with a recruiter prior to or after applying for a job opportunity posted by the recruiter. In some embodiments, the candidate 102 may receive alert notification whenever there is any job opportunity according to candidate's interest, location, skill set etc. is posted.

Further, the recruitment system 108A (108C) may notify the candidate 102 when the job application is delivered to the recruiter 104 (or other recruiters), and/or read/seen or any action is performed on the job application of the candidate 102 by the recruiter 104.

In some embodiments, the digital recruitment system 108A enables the candidate 102 to search one or more jobs on the job seeker interface. The digital recruitment system 108A may allow the candidate 102 to perform location-based job search, skill set based job search, company-based job search, industry-based job search, and so forth. In some embodiments, the digital recruitment system 108A (or the 108C) may allow the candidate 102 to perform an augmented screen (or augmented reality) based job search. For example, the candidate 102 may switch on a camera of the first computing device 106 to capture at least one of a location image, a video or live video, and based on the captured location image, video etc., the digital recruitment system 108A may search for available job opportunities in and/or nearby the location and display to the candidate via the job seeker interface. The available job opportunities may be displayed in at least one of a map representation, a list view, and so forth.

The digital recruitment system 108B (or 108C) may present a recruiter interface on the second computing device 110. The recruiter interface may include one or more options comprising such as, but not limited to, candidate searching options, candidate assessing options, data sharing and communication options, multimedia response recording/reviewing/editing options, candidate shortlisting options, live messaging options, data storage options, feedback options, uploading options, data analyzing options, and so forth. The candidate searching options may allow the recruiter 104 to search for candidates based on one or more criteria like location, image, video, skill set, job location, and so forth. The candidate assessing options may allow the recruiter 104 to assess candidates by reviewing the job applications received from the candidates (or candidate 102). The data sharing and communication options may allow the recruiter 104 to share data with other users like candidates or recruiters etc. or broadcast a message for communicating with the users. In some embodiments, the data sharing and communication options comprises an automate option to enable the recruiter 104 to send the one or more messages to the selected candidates based on a selection of at least one of the automate option. In some embodiments, the data sharing and communication options comprises a broadcast option to enable the recruiter 104 to send the one or more messages to the all the candidates applying for a job opportunity.

The candidate 102 accesses the digital recruitment system 108A (or 108C) through the first computing device 106. The candidate 102 can search for a job opportunity and apply for the job opportunity via the job seeker interface. In some embodiments, the digital recruitment system 108A (or 108C) may automatically initiate a conversation with the candidate 102 by asking pre-defined questions when the candidate initiates a job application process through the job seeker interface. The pre-defined questions may include one or more questions set by the recruiter 104 for the plurality of candidates in accordance with the job opportunity.

The digital recruitment system 108A may enable the candidate 102 to create a job application including at least one multimedia including one or more sections for applying to at least one job opportunity posted by the recruiter 104. The candidate 102 may create the job application by at least one of creating and attaching an information file like a word file, a PPT file, a PDF file, and so forth, recording, reviewing, editing, re-recording, and combining the one or more sections. The one or more sections may include at least one of a video, an audio, an image, a text message, a live chat message, an automatic message, and the information file. The system 108A may allow the candidate 102 to combine the one or more sections in any order, not necessarily in an order of recording of the one or more sections. This means, the candidate 102 may create the at least one multimedia by embedding a second section before the first section. The second section was recorded after the first section. In some embodiments, the digital recruitment system 108A may enable the candidate 102 to create the at least one multimedia including one or more sections of a pre-defined duration for applying to a job opportunity posted by the recruiter 104. In another embodiment, the candidate 102 may create the at least one multimedia by at least one of recording, reviewing, editing, and re-recording a multimedia. For example, the candidate 102 can record a multimedia and review it, if not satisfied, then the candidate 102 may also edit or re-record the multimedia by using the digital recruitment system 108A (or 108C). The digital recruitment system 108A may allow the candidate 102 to send the at least one multimedia to the recruiter 104 by using the first computing device 106. The candidate 102 may record and send the at least one multimedia for applying to a job opportunity or for negotiating while a recruitment process. The digital recruitment system 108A also enables the candidate 102 to quickly edit the at least one multimedia prior to sending or uploading to a server device in the network 112.

In some embodiments, the at least one multimedia may include a personal job application video comprising at least one of curriculum vitae (CV) information of the candidate 102, cover letter information of the candidate 102, an interview, and negotiation information. In some embodiments, the multimedia comprises a real-time video, a live video, text messages, and so forth. In some embodiments, the digital recruitment system 108 is further configured to enable the candidate 102 to process the at least one multimedia according to one or more pre-defined conditions defined by at least one of the recruiter 104 and the one or more job publishing platforms. The at least one multimedia may be of a pre-defined duration for example 27 seconds. The system 108A (or 108C) may allow the candidate 102 to send the job application to the recruiter 104 via the job seeker interface. In some embodiments, the candidate 102 may be an owner of the job application and the at least one multimedia and the multimedia and job application may remain stored in the first computing device 106. The candidate 102 may delete or withdraw the job application and/or the multimedia for example after a duration or time. The recruiter 104 accesses the digital recruitment system 108B (or 108C) through the recruiter interface on the second computing device 110. The digital recruitment system 108B (or 108C) displays the job application along with augmented data on the recruiter interface of the recruiter 104. Examples of the augmented data may include, but are not limited to, user, location, time, supporting text, and resume. The digital recruitment system 108B may allow the recruiter 104 to toggle this information on/off and move between overlays. The recruiter 104 may review the job application and the augmented data through the recruiter interface. The digital recruitment system 108B (or 108C) also enables the recruiter 104 to create at least one multimedia response including at least one section for interacting with the candidate by at least one of recording, reviewing, editing, re-recording, and combining the at least one section comprising at least one of a video, an audio, an image, an automatic message, a live chat message, a text message, and an information file. In some embodiments, the digital recruitment system 108B (or 108C) also enables the recruiter 104 to create at least one multimedia response of a pre-defined duration. The system 108B may allow the recruiter 104 to combine the at least one section in any order, not necessarily in an order of recording of the one or more sections. This means, the recruiter 104 may create the at least one response by embedding a second section before the first section. The second section was recorded after the first section. In some embodiment, the recruiter 104 may create the at least one multimedia response by at least one of recording, reviewing, editing, and re-recording a multimedia response. For example, the recruiter 104 may create or capture a multimedia response based on a review of the at least one multimedia received on the second computing device 110. Further, the recruiter 104 can record a multimedia response and review it, if not satisfied, then the recruiter 104 may edit or re-record the multimedia response by using the digital recruitment system 108B (or 108C). The digital recruitment system 108 also enables the recruiter 104 to quickly edit the at least one response prior to sending or uploading to the server device.

The recruiter 104 may send the recorded at least one multimedia response to the candidate 102 via the digital recruitment system 108B (or 108C). The digital recruitment system 108 enables the candidate 102 to receive the at least one multimedia response from the recruiter 104. The recruiter 104 may send the at least one multimedia response based on a review of the received at least one multimedia of the candidate 102 for assessing the candidate 102 for the job opportunity or during a recruitment process.

In some embodiments, the digital recruitment system 108 is configured to integrate with the one or more job publishing platforms to enable the plurality of candidates and the one or more recruiters to access the one or more job publishing platforms directly through the digital recruitment system 108. In some embodiments, the digital recruitment system 108 is configured to automatically analyse the job application and the at least one multimedia response by performing sentiment analysis to determine an interest level of the candidate and the recruiter, respectively. Further, in some embodiments, the digital recruitment system 108 is configured to provide a first feedback about the job application to the recruiter 104 and a second feedback about the at least one multimedia response to the candidate 102, respectively based on the analysis. For example, the system 108A may inform the candidate 102 about an interest level of the recruiter 104 by analysing the multimedia response of the recruiter 104.

Further, the digital recruitment system 108 may store visual guide comprising one or more instructions for using the digital recruitment system and creating and sharing the multimedia, registration information, candidates' information, recruiters' information, job opportunities' information, recorded multimedia, and recorded multimedia responses.

Similarly, the digital recruitment system 108B may enable the recruiter 104 to search for one or more candidates or job seekers via the recruiter interface. The recruiter interface includes search options that the recruiter 104 can select to search for one or more candidates for a job opportunity. The recruitment system 108B may search the candidates by matching a job criteria or job requirements like qualification, skills required etc. with skill set of a plurality of candidates seeking job in a particular area. The system 108B may store the details about the plurality of candidates. The digital recruitment system 108B may allow the recruiter 104 to perform location-based candidate search, skill set based candidate search, company-based candidate search, a job criteria-based search, an industry-based candidate search, and so forth. In some embodiments, the digital recruitment system 108B may allow the recruiter 104 to perform augmented screen (or augmented reality) based candidate search. For example, the recruiter 104 may switch on a camera of the second computing device 110 to capture at least one of a location image, a video or live video, live camera feed, and based on the captured location image, video etc., the digital recruitment system 108B may search for candidates in and/or nearby the location and display to the recruiter 104 via the recruiter interface. The candidates i.e. the people looking for job or matching the job criteria may be displayed in at least one of a map representation, a list view, a pictorial view, and so forth.

In some embodiments, the system 108 may protect the content such as the job application comprising the multimedia/video/image/text etc. and the at least one multimedia response from editing by a third person other than an owner of the content. For example, the candidate 102 may be the owner of the job application and the recruiter 104 may be the owner of the at least one multimedia response. Further, the job application and the at least one multimedia response may be stored and may be available for viewing and processing for a pre-defined time only. The pre-defined time may be set by the respective owner. The job application and the at least one multimedia response may be temporary multimedia and may get automatically deleted after at least one of the pre-defined time or based on a delete input received from the respective owner. In some embodiments, the job application and the at least one multimedia response are stored locally on the computing device of the owner or in a profile of the owner in the centralized database for example at the system 108C.

In some embodiments, the system 108B (or 108C) displays the job application on the recruiter interface. In some embodiments, the recruiter interface may include at least three sections comprising a multimedia section for displaying the received job application, a live messaging section for allowing live communication between the recruiter 104 and the candidate 102, and a notes section for allowing the recruiter 104 to write notes based on the review of the job application of the candidate 102. The recruiter interface may further include a shortlists section to allow the recruiter 104 to shortlist one or more candidates for the job opportunities. Further, the recruiter interface may include one or more action options to allow the recruiter 104 to take one or more action based on the review of the job application.

In some embodiments, the system 108 is configured to provide one or more communication options comprising an automate option and a broadcast option to the recruiter 104 for communicating with the plurality of candidates who applied to the one or more job opportunities, wherein the automate option allows the recruiter to send one or more messages to a selected list of candidates, wherein the broadcast option allows the recruiter 104 to broadcast a message to the plurality of candidates.

In some embodiments, the system 108 is allows the candidate to create a cover letter or a video cover letter. The video cover letters are authentic cover letter as they are un-editable by any other person than the owner of the video cover letter, and also includes timestamp and/or location information. In some embodiments, the video cover letter is a short video showing off candidate's personality and skills to prospective recruiters or hiring managers. Further, the system 108 may automatically embed location and timestamp information into the video cover letter (or the job application) that may prove an authenticity of the video cover letter/job application. In some embodiments, the system 108 enables the candidate to create the video cover letter comprising at least one section by at least one of creating and attaching an information file, recording, reviewing, editing, re-recording, and combining the at least one section. The at least one section may include a video, an audio, an image, a text message, a live chat message, an automatic message, an information file, and so forth. The system 108 may make the video cover letters authentic by automatically adding location and/or timestamp information and adding some security options such as, but not limited to, adding password security, making the cover letters uneditable by anyone else other than the owner of the cover letters, and so forth. In some embodiments, the system 108 also provides options to the candidate to allow how the job application or the video cover letter is accessed by the receiver of the same. The options may include such as a forwarding permission for allowing the receiver to share information (e.g. the job application, video resume, video cover letter etc.) of the candidate with others (e.g. other recruiters, managers, etc.), an editing permission for allowing (or restricting) the receiver for making any changes in the job application and so forth.

Figure 2:
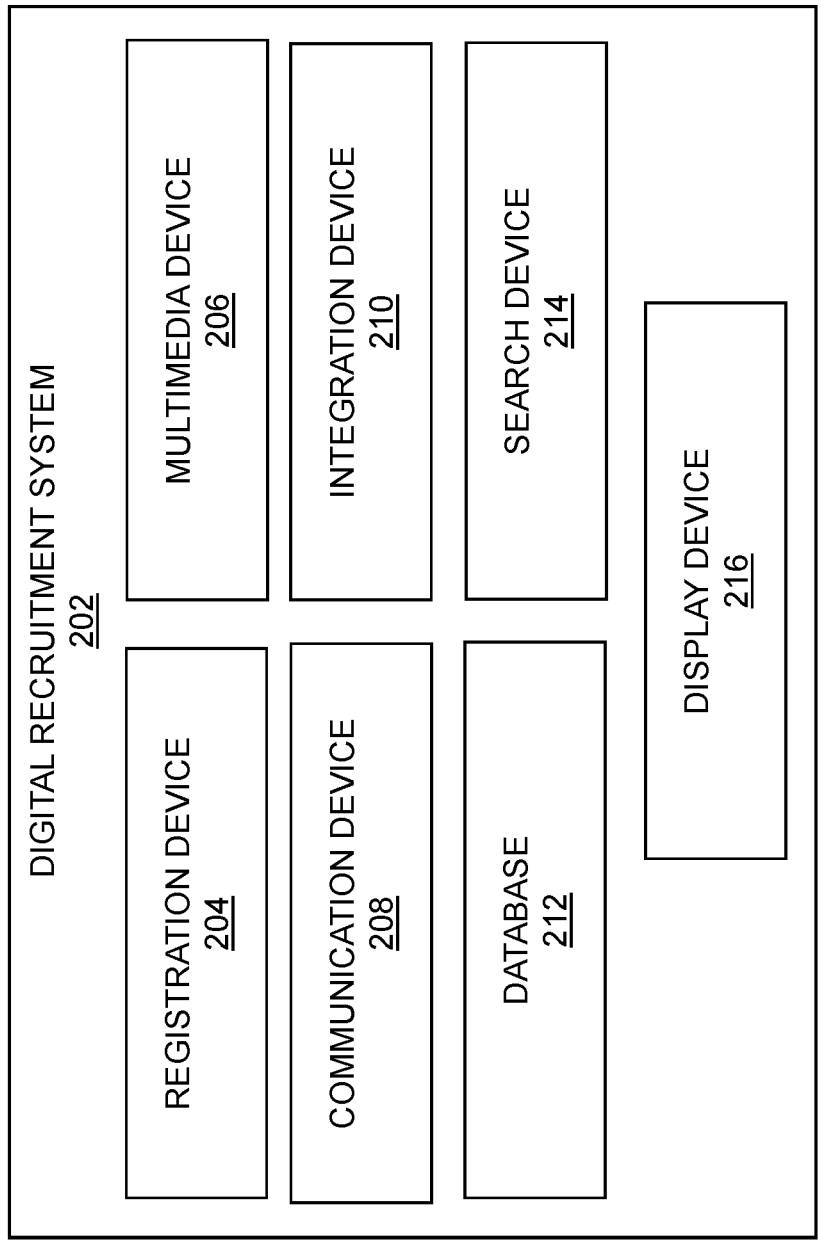
FIG. 2 is a block diagram illustrating various system elements of an exemplary digital recruitment system, in accordance with an embodiment of the present disclosure.

Referring to the FIG. 2, a block diagram 200 illustrating system elements of an exemplary digital recruitment system 202 is shown, in accordance with an embodiment of the present disclosure. As shown, the digital recruitment system 202 includes a registration device 204, a multimedia device 206, a communication device 208, an integration device 210, a database 212, a search device 214, and a display device 216. Further, the digital recruitment system 202 (hereinafter may be referred as recruitment system 202 or system 202 without change in its meaning) may include less or more modules or devices than shown in the FIG. 2. The devices 204-216 may be connected to each other and exchange data with each other. In some embodiments, the devices 204-212 may be connected to each other via a bus. Further, each of the devices 204-216 may include software, hardware, firmware, and combination of these.

The display device 216 is configured to present a user interface to a plurality of users comprising the plurality of candidates and the one or more recruiters, wherein the plurality of candidates is presented with a job seeker interface and the one or more recruiters are presented with a recruiter interface. The job seeker interface may include options to help a candidate to search and apply for a job opportunity by creating a job application including multimedia. The recruiter interface may include options to enable a recruiter to post or publish job opportunities, receive job applications, review and shortlist job applications and interact with the candidates of the job applications or shortlisted job applications. The display device 216 is further configured to display the job application on the recruiter interface, the recruiter interface comprising at least three sections comprising a multimedia section for displaying the received job application, a live messaging section for allowing live communication between the recruiter and the candidate, and a notes section for allowing the recruiter to write notes based on the review of the job application of the candidate. In some embodiments, the recruiter interface further comprises a shortlists section to allow the recruiter to shortlist one or more candidates for the job opportunities. The recruiter interface may also include one or more action options to allow the recruiter to take one or more action based on the review of the job application. The one or more action may include sending a live message to a candidate, sending an email to the candidate, arranging an interview with the candidate, hiding or deleting the job application, and so forth.

In some embodiments, the display device 216 may be configured to provide one or more communication options comprising an automate option and a broadcast option to the recruiter for communicating with the plurality of candidates who applied to the one or more job opportunities, wherein the automate option allows the recruiter to send one or more messages to a selected list of candidates, wherein the broadcast option allows the recruiter to broadcast a message to the plurality of candidates.

The registration device 204 is configured to enable the plurality of users such as a plurality of candidates and the one or more recruiters to register with the digital recruitment system 202. The one or more recruiters may include person that posts one or more job opportunities through at least one of the recruiter interface and one or more job publishing platforms like online job portals. Further, the candidates may search and apply for the one or more job opportunities through the job seeker interface. In some embodiments, the registration device 204 is further configured to authenticate at least one of an identity and a location of the plurality of candidates and the one or more recruiters registered with the digital recruitment system 202.

The multimedia device 206 is configured to enable a candidate of the plurality of candidates to create a job application comprising at least one multimedia comprising one or more sections for applying to a job opportunity posted by a recruiter of the one or more recruiters, wherein the candidate creates the job application by at least one of creating and attaching an information file, recording, reviewing, editing, re-recording, and combining the one or more sections comprising at least one of a video, an audio, an image, a text message, a live chat message, an automatic message, and the information file. The multimedia device 206 may allow the candidate to combine the one or more sections in any order. Further, the multimedia device 206 enables the candidate to quickly edit the multimedia or the one or more sections of the multimedia. In some embodiments, the multimedia device 206 automatically edits the one or more sections during recording of the one or more sections.

In some embodiments, the multimedia device 206 may enable the candidate to create and/or process the at least one multimedia of a pre-defined duration for applying to a job opportunity posted by a recruiter of the one or more recruiters. The multimedia device 206 may allow for an authentic presentation, not a produced one. The multimedia like the at least one multimedia must show the actual candidate in his/her natural or chosen state and not enable or allow a third person or party to edit or post production edit of their multimedia including job application. The multimedia device 206 is further configured to enable the candidate to process the at least one multimedia according to one or more pre-defined conditions. The conditions may be defined or preset by at least one of the recruiter and the one or more job publishing platforms. Examples of the conditions may include, but are not limited to, content of the multimedia must have a focus and limit, must be acceptable to allow points across and not drain on for recruiter. For example, the duration of the multimedia may not exceed 27 seconds. Further, the at least one multimedia may include a personal job application video comprising at least one of curriculum vitae (CV) information of the candidate, cover letter information of the candidate, an interview, and negotiation information.

Further, the multimedia device 206 may enable the recruiter to create at least one multimedia response comprising at least one section for interacting with the candidate by at least one of recording, reviewing, editing, re-recording, and combining the at least one section comprising at least one of a video, an audio, an image, an automatic message, a live chat message, a text message, and an information file. In some embodiments, the device 206 enables the recruiter to create at least one multimedia response of a pre-defined duration. In some embodiments, the multimedia device 206 is further configured to process or edit or analyse the multimedia response. The recruiter can view the received at least one multimedia on the recruiter interface on a display screen of an associated computing device or web platforms like in a browsing application on the computing device.

Further, the at least one multimedia and the at least one multimedia response may be stored in the database 212 and may be available for viewing and processing for a pre-defined time. Further, the at least one multimedia and the at least one multimedia response are temporary multimedia and may expire after the pre-defined time. For example, the at least one multimedia and the at least one multimedia response may expire or may be removed as soon the pre-defined time expires. For example, the recruiter may be able to view the received at least one multimedia received from the candidate for 10 days from the time of receiving. This may automatically free up storage space on a second computing device of the recruiter and the first computing device of the candidate. In some embodiments, the at least one multimedia and the multimedia response may include location information of the sender and/or timestamp information. For example, the multimedia device 206 may automatically embed or augment the location and/or timestamp information into the at least one multimedia and the multimedia response. This location and/or timestamp information may prove that the at least one multimedia and the multimedia response are authentic and coming from authentic sender and location. For example while recording a video cover letter if a candidate mentions he/she is located in London, but the embedded location information shows Italy, then the recruiter will see that the candidate is not in London actually, hence the video cover letter may not be considered authentic. The multimedia device 206 may also provide an option to the creator e.g. the candidate of the multimedia to make the multimedia uneditable. This way the receiver of the multimedia may not be able to make any changes in the multimedia. Further, the at least one multimedia and the at least one multimedia response may include a video message. In some embodiments, the at least one multimedia comprises a video cover letter which is an authentic cover letter as it includes location information of the sender (e.g. the candidate) and/or timestamp information. Also the video cover letters are uneditable, it means no other person than the owner of the video cover letter can change the video cover letter.

In some embodiments, the multimedia device 206 may enable the creation of multimedia (or multimedia response) on a computing device like mobile phone, and then upload on a network device like a server. In some embodiments, the multimedia device 206 is further configured to enable creation of multi shot video with editing prior to uploading or sending. Further, the multimedia device 206 may protect the at least one multimedia and the at least one multimedia response from editing by a third person. In some embodiments, the multimedia device 206 may protect the job application and the at least one multimedia response from editing by a third person other than an owner. For example, the candidate is the owner of the job application and the recruiter is the owner of the at least one multimedia response.

In some embodiments, the job application includes a personal job application video comprising at least one of curriculum vitae (CV) information of the candidate, cover letter information of the candidate, an interview, and negotiation information. The job application and the at least one multimedia response are stored and is available for viewing and processing for a pre-defined time.

In some embodiments, the multimedia device 206 may enable the candidate to create the multimedia and the recruiter to create the at least one multimedia response of a pre-defined duration by recording, reviewing and editing prior to uploading or sending.

In some embodiments, the multimedia device 206 is configured to automatically analyse the job application and the at least one multimedia response by performing sentiment analysis to determine an interest level of the candidate and the recruiter, respectively. Based on the analysis the multimedia device 206 may provide a first feedback about the job application to the recruiter and a second feedback about the at least one multimedia response to the candidate. For example, based on the analysis of the job application or the multimedia in the job application, the device 206 may provide the first feedback like the candidate is highly interested in the job opportunity by analyzing sentiments or expressions of the candidate in the multimedia of the job application. Similarly, by analyzing the multimedia response, the device 206 may provide the second feedback such as the recruiter liked candidate's resume or job application.

The communication device 208 is configured to facilitate communication or exchange of information between the candidate and the recruiter or other users. The communication or exchange of information may be facilitated by allowing the candidate to send the job application to the recruiter via the job seeker interface, wherein the display device displays the job application along with augmented data on the recruiter interface of the recruiter, the recruiter reviews the job application and the augmented data through the recruiter interface. The recruiter may send the at least one multimedia response based on a review of the received job application and/or the at least one multimedia of the candidate for assessing the candidate for the job opportunity. In some embodiments, the candidate may share a link like a URL or a storage location for accessing the at least one multimedia with the recruiter. Similarly, the recruiter may share a link like a URL or a storage location for accessing the at least one multimedia response with the candidate. Sharing of information via multimedia comprising video message may result in interactive and real like communication between the candidate and the recruiter. In some embodiments, the communication device 208 may enable candidates and/or recruiters to communicate in an online social network that currently does not exist.

In some embodiments, the communication device 208 may enable the candidate to receive the at least one multimedia response from the recruiter, wherein the recruiter sends the at least one multimedia response to assess the candidate based on the job application during a recruitment process. The communication device 208 may send the one or more messages to at least one of the selected candidates and the plurality of candidates based on a selection of at least one of the automate option and the broadcast option by the recruiter. In some embodiments, the communication device 208 may automatically initiate a conversation with the candidate by asking pre-defined questions when the candidate initiates a job application process through the job seeker interface. The pre-defined questions may be set by the recruiter for the plurality of candidates in accordance with the job opportunity.

The integration device 210 is configured to integrate the digital recruitment system 202 with the one or more job publishing platforms to enable the plurality of users including the candidates and the recruiters to access the one or more job publishing platforms directly through the digital recruitment system 202. The integration may be passive integration so that the system 202 can be included without job platforms' knowledge or active integration so that the system 202 may be integrated with the job publishing platforms with job publishing platforms' knowledge. The recruitment system 202 (or 108) may be implemented or used with low quality mobile networks at no sacrifice to service.

The database 212 is configured to store a visual guide comprising one or more instructions for using the digital recruitment system and creating and sharing the multimedia, registration information, candidates' information, recruiters' information, job opportunities' information, the one or more sections, the at least one section, the job applications comprising the multimedia, shortlisted job applications, and multimedia responses. The data may be stored in the database 212 by using various data compression techniques without effecting a quality of the data comprising videos or multimedia.

The search device 214 is configured to enable the plurality of candidates to perform an augmented screen-based search for the one or more job opportunities based on a location, an image, a live camera feed, and a video through the job seeker interface. Further, the search device 214 may enable the one or more recruiter to perform an augmented screen-based (or augmented reality based) search for at least one candidate suitable for the one or more job opportunities based on a location, an image, a live camera feed, and a video through the recruiter interface.

Figure 3A:
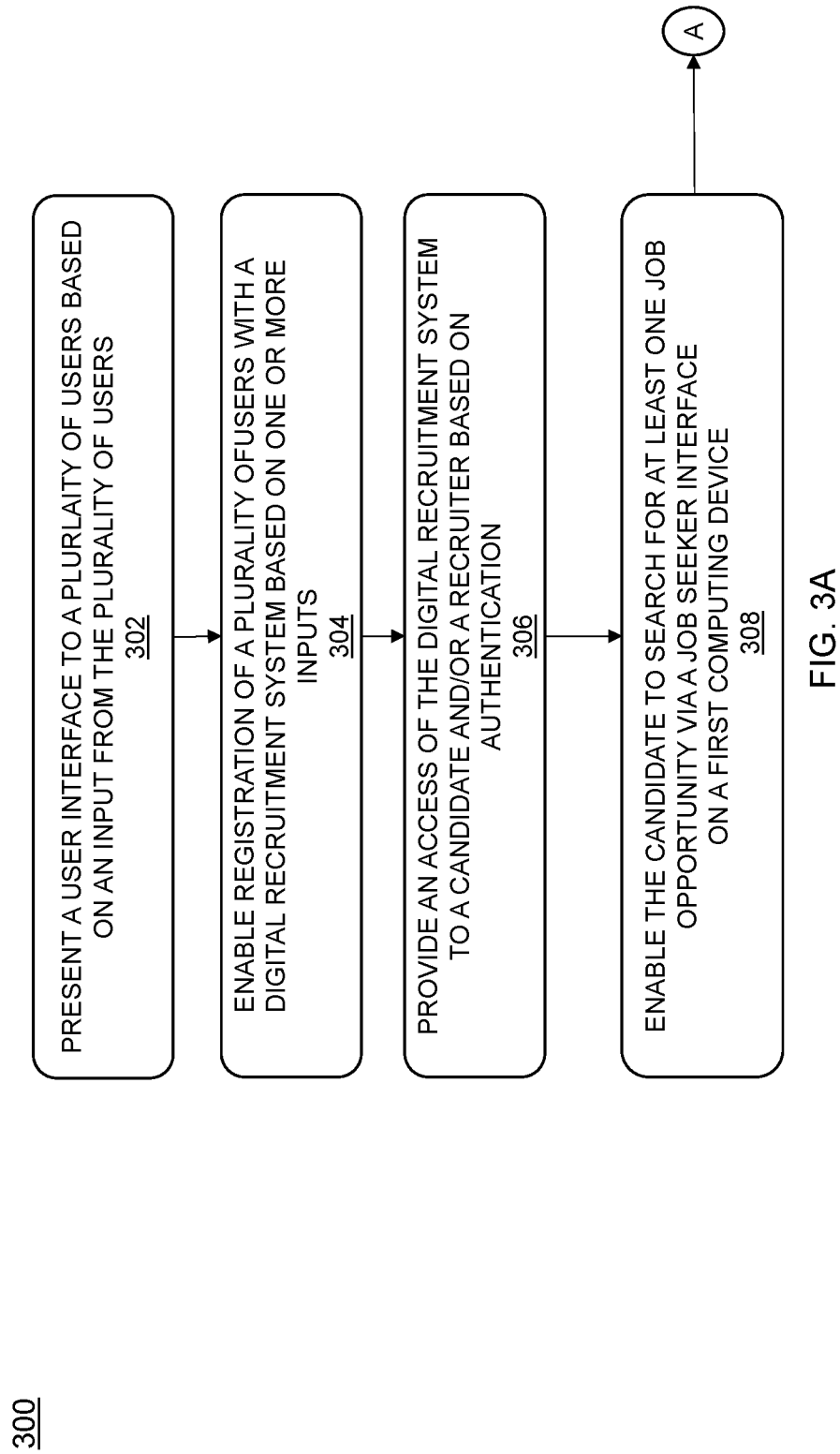
FIGS. 3A-3B depicts a flowchart diagram illustrating an exemplary method for creating and sharing a multimedia for a recruitment process, in accordance with an embodiment of the present disclosure.
Figure 3B:
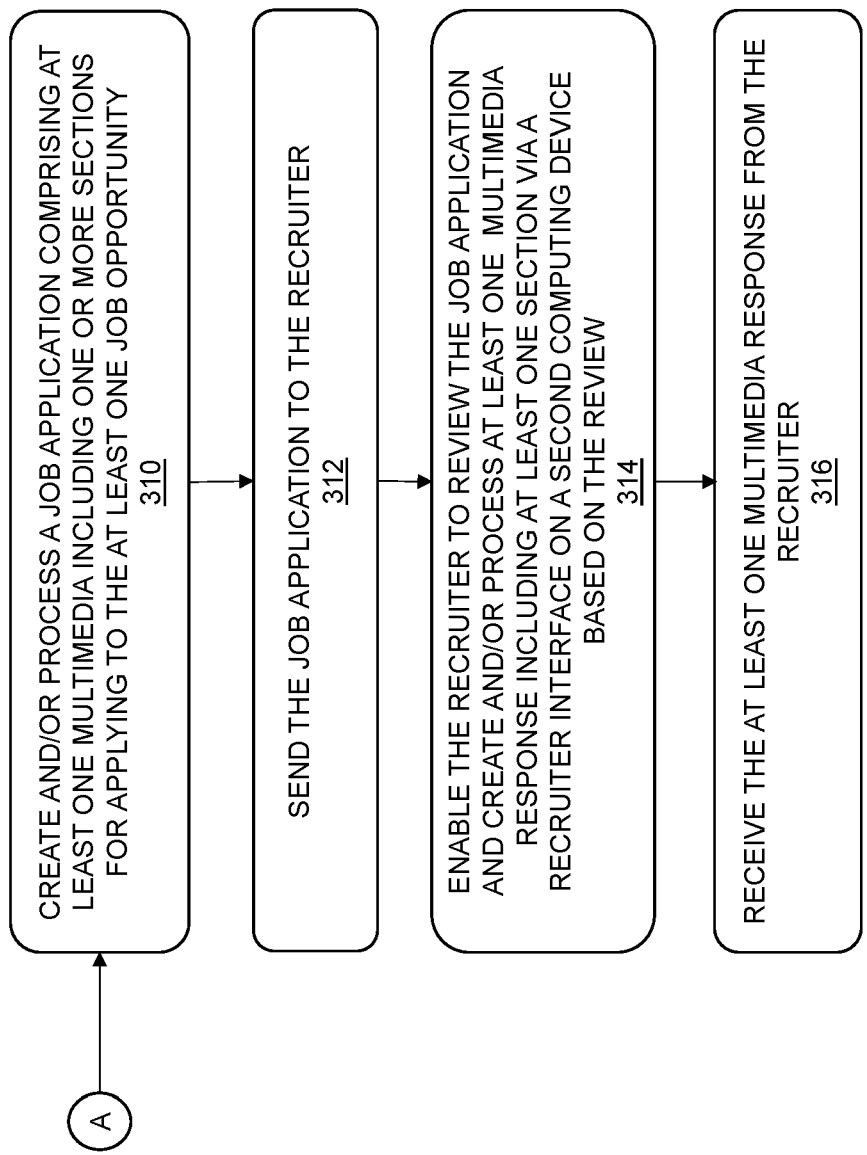

FIGS. 3A-3B depicts a flowchart diagram illustrating an exemplary method 300 for creating and sharing a multimedia for a recruitment process by using a digital recruitment system such as the recruitment system 202 as discussed with reference to the FIG. 2, in accordance with an embodiment of the present disclosure.

At step 302, the digital recruitment system 202 presents a user interface to a plurality of users such as candidates and recruiters. The candidate accesses the recruitment system 202 on a first computing device like smart phone and the recruiter accesses the digital recruitment system 202 on a second computing device like a computer. The candidate is presented with a job seeker interface and the recruiter is presented with a recruiter interface based on a selection by the candidate and the recruiter.

At step 304, the users i.e. a candidate and a recruiter register with a digital recruitment system. In some embodiments, the registration module 204 registers the plurality of candidates and the one or more recruiters with the digital recruitment system 202 and create a profile for each of the candidates and the recruiters. At step 306, the recruitment system 202 may provide of the system 202 an access to the candidate and/or the recruiter based on authentication. In some embodiments, the registration device 204 provides the access to the candidate and the recruiter by authenticating the candidate and the recruiter based on their respective information stored in the system 202.

Then at step 308, the recruitment system 202 enables the candidate to search for at least one job opportunity via a job seeker interface on a first computing device. Then at step 310, the candidate creates and/or processes a job application including at least one multimedia comprising a video including one or more sections for applying to the at least one job opportunity. In some embodiments, the multimedia device 206 enables the candidate to create the job application and/or the at least one multimedia of a pre-defined duration like of 27 seconds. The at least one multimedia may be a focused video message for applying for a job. The at least one multimedia may include audio/video message including information in paragraph or pointers form. The information may include CV/resume information of the candidate, the cover letter information, an interview, a live video, negotiation information, and other information required during a recruitment process. Further, the candidate may quickly edit the multimedia prior to sending to the recruiter or uploading to the server device in a network. The candidate may apply for a job opportunity by sending the at least one multimedia to a recruiter. In some embodiments, the candidate is allowed to download a copy of the at least one multimedia on his/her first computing device.

At step 312, the candidate sends the job application to a recruiter via the job seeker interface for applying for a job opportunity. The recruiter may be a person who posted the job opportunity on at least one job publishing platforms. In some embodiments, the communication device 208 allows the candidate to send the job application from the first computing device to the recruiter. The recruiter may be able to view and review the at least one multimedia by using the recruitment system 202. In some embodiments, the recruiter may view the at least one multimedia for a limited period of time like for 10 days.

Then at step 314, the recruitment system 202 may enable the recruiter to review the job application and to create and/or process at least one multimedia response including at least one section on the second computing device associated with the recruiter. In some embodiments, the multimedia device 206 enables the recruiter to create and/or process at least one multimedia response of a pre-defined duration on the second computing device. Further, the recruiter may quickly edit the multimedia response prior to sending to the candidate or uploading to the server device in a network.

Thereafter, at step 316, the candidate receives the at least one multimedia response from the recruiter via the digital recruitment system 202. In some embodiments, the communication device 208 enables the candidate to receive the at least one multimedia response from the recruiter. The candidate may again send a multimedia in response to the received multimedia response, and hence the digital recruitment system 202 may enable a two-way communication between the candidate and the recruiter. The digital recruitment system 202 may enable a real-time communication between the candidate and the recruiter in a recruitment process. The recruiter and the candidate may share information, videos, audios, documents, images, etc. by using the system 202. In some embodiments, the candidate may view the at least one multimedia response for a limited period of time like for 10 days. In some embodiments, the recruiter is allowed to download a copy of the at least one multimedia response on his/her second computing device.

In an exemplary scenario, a candidate may register and then login to the digital recruitment system from their computing device like mobile phone. The candidate may search for one or more jobs based on a search criteria comprising at least one of a skill set, a job location, a qualification, an industry, and candidate's location via a job seeker interface of the digital recruitment system. Then the digital recruitment system searches for the job opportunities meeting the candidate's search criteria and presents the job opportunities to the candidate in a suitable representation such as, but not limited to, a map, a list view, and so forth. The candidate may select a job and initiate the job apply process. In some embodiments, the digital recruitment system may ask one or more questions from the candidate during the job apply process. The questions may be pre-defined questions for the job opportunity. Then the candidate may capture a multimedia such as a video, image, etc. using a camera of the mobile phone. The candidate may create the job application by including such as, but not limited to, the multimedia, a resume file, a cover letter, etc. In some embodiments, the digital recruitment system may create the job application automatically based on candidate's previous data or job application, profile, stored multimedia, resume etc. by using AI and ML. The candidate may then review the job application and include other information if required and submit the job application. The job application may be received by a recruiter of the job opportunity.

Then, the recruiter may login to the digital recruitment system on his/her associated second computing device like a computer. The digital recruitment interface may present a recruiter interface to the recruiter. The recruiter may review the received job applications and then may take an action like creating a shortlist of job applications, contacting candidates of the job applications and so forth. The digital recruitment system may allow the recruiter to review the job applications and chat with the candidates in real-time. Further, the recruiter may take an interview of the candidates through the recruiter interface itself. The recruiter may also make notes based on the review of the job applications. In some embodiments, the digital recruitment system may use AI (Artificial Intelligence) or ML (Machine Learning) to automatically review the job applications and present a feedback to the recruiter about the job applications and may send mail or message to the candidates of the job applications automatically. The recruiter may set a time for sending messages or mails to the candidates or the recruiter can move a candidate to a new list based on the review. In some embodiments, the recruiter may enable a 1-click job application and may specify criteria for reviewing. The recruiter system may automatically review the received job applications based on criteria and may rule out the job applications automatically if they don't follow the criteria. Examples of the criteria may include job application must include a video, a cover letter, a resume, must be of 1 minute, location of the candidate must be New York, and so forth.

The present disclosure provides a video-based digital recruitment system and method for enabling a candidate to create and share a video comprising information with one or more recruiters to apply for a job opportunity. The information may include such as, but not limited to, a cover letter information, a resume information, and negotiation information. The video-based digital recruitment system enables the candidates and recruiters to create, view and share short temporary videos comprising information. The video-based digital recruitment system may be installed on a respective computing device of the candidate and the recruiter. Alternatively, the candidate and the recruiter may access the video-based digital recruitment system via a browsing application, like Google Chrome, on their respective computing device.

According to an embodiment of the present disclosure, a method for enabling a plurality of candidates to share information with one or more recruiters in a recruitment process is disclosed. The method includes presenting, by a display device, a user interface to a plurality of users comprising the plurality of candidates and the one or more recruiters, wherein the plurality of candidates is presented with a job seeker interface and the one or more recruiters are presented with a recruiter interface; enabling, by a registration device of a digital recruitment system, the plurality of users to register with the digital recruitment system, wherein the one or more recruiters posts one or more job opportunities through at least one of the recruiter interface and one or more job publishing platforms, wherein the plurality of candidates applies for the one or more job opportunities through the job seeker interface; enabling, by a multimedia device of the digital recruitment system, a candidate of the plurality of candidates to create a job application comprising at least one multimedia comprising one or more sections for applying to at least one job opportunity, wherein the candidate creates the job application by at least one of creating and attaching an information file, recording, reviewing, editing, re-recording, and combining the one or more sections comprising at least one of a video, an audio, an image, a text message, a live chat message, an automatic message, and the information file; enabling, by the multimedia device, a recruiter to create at least one multimedia response comprising at least one section for interacting with the candidate, wherein the recruiter creates the at least one multimedia response by at least one of recording, reviewing, editing, re-recording, and combining the at least one section comprising at least one of a video, an audio, an image, an automatic message, a live chat message, a text message, and an information file; and facilitating, by a communication device of the digital recruitment system, communication between the candidate and the recruiter by: allowing the candidate to send the job application to the recruiter via the job seeker interface, wherein the job application along with augmented data is displayed on the recruiter interface of the recruiter, the recruiter reviews the job application and the augmented data through the recruiter interface; and enabling the candidate to receive the at least one multimedia response from the recruiter on the first computing device, wherein the recruiter sends the at least one multimedia response to assess the candidate based on the job application during a recruitment process.

According to another aspect of the present disclosure, the method includes enabling, by a search device, the plurality of candidates to perform an augmented screen-based search for the one or more job opportunities based on a location, an image, a live camera feed, and a video through the job seeker interface; and enabling, by a search device, the one or more recruiter to perform an augmented screen-based search for at least one candidate suitable for the one or more job opportunities based on a location, an image, a live camera feed, and a video through the recruiter interface.

According to another aspect of the present disclosure, the method performing the following by the multimedia device: automatically analysing the job application and the at least one multimedia response by performing sentiment analysis to determine an interest level of the candidate and the recruiter, respectively; providing a first feedback about the job application to the recruiter and a second feedback about the at least one multimedia response to the candidate, respectively based on the analysis; enabling the candidate to process the at least one multimedia according to one or more pre-defined conditions defined by at least one of the recruiter and the one or more job publishing platforms; enabling the candidate to create the multimedia and the recruiter to create the at least one multimedia response of a pre-defined duration by recording, reviewing and editing prior to uploading or sending; and protecting the job application and the at least one multimedia response from editing by a third person other than an owner, wherein the candidate is the owner of the job application and the recruiter is the owner of the at least one multimedia response.

According to another aspect of the present disclosure, the method includes integrating, by an integration device, the digital recruitment system with the one or more job publishing platforms to enable the plurality of users to access the one or more job publishing platforms directly through the digital recruitment system.

According to another aspect of the present disclosure, the method includes performing the following by the display device: displaying the job application on the recruiter interface, the recruiter interface comprising at least three sections comprising a multimedia section for displaying the received job application, a live messaging section for allowing live communication between the recruiter and the candidate, and a notes section for allowing the recruiter to write notes based on the review of the job application of the candidate, the recruiter interface further comprises a shortlists section to allow the recruiter to shortlist one or more candidates for the job opportunities, the recruiter interface also comprises one or more action options to allow the recruiter to take one or more action based on the review of the job application.

In some embodiments, the digital recruitment system may provide a one-click advertise option to the recruiter for publishing or posting a job opportunity. Further, the recruiter may set an option on the recruiter interface to allow the candidates to apply for a job via one-click apply option of the digital recruitment system. Further, the digital recruitment system may analyse the received job applications of the plurality of candidates and may analyse the job applications that doesn't satisfy the job requirements like skill set, location, etc.

In some embodiments, the method also include providing one or more communication options comprising an automate option and a broadcast option to the recruiter for communicating with the plurality of candidates who applied with the one or more job opportunities, wherein the automate option allows the recruiter to send one or more messages to a selected list of candidates, wherein the broadcast option allows the recruiter to broadcast a message to the plurality of candidates.

The method further may include storing, in a database of the digital recruitment system, a visual guide comprising one or more instructions for using the digital recruitment system and creating and sharing the multimedia, registration information, candidates' information, recruiters' information, job opportunities' information, the one or more sections, the at least one section, the job applications comprising the multimedia, shortlisted job applications, and multimedia responses.

According to an aspect of the present disclosure, the method also includes authenticating, by the registration device, at least one of an identity and a location of the plurality of candidates and the one or more recruiters registered with the digital recruitment system.

According to an aspect of the present disclosure, the method also includes performing the following by the communication device: sending the one or more messages to at least one of the selected candidates and the plurality of candidates based on a selection of at least one of the automate option and the broadcast option by the recruiter; and automatically initiating a conversation with the candidate by asking pre-defined questions set by the recruiter for the plurality of candidates in accordance with the job opportunity when the candidate initiates a job application process through the job seeker interface.

The digital recruitment system may present the job application on the recruiter interface along with augmented data such as location of the candidate, time of applying, and so forth. In some embodiments, the job application data may be presented as a map representation showing exact location of the candidate based on the job application. This way, the system may provide right information about location of the candidate. Therefore, the system may ensure that the right people interact from the right location during the recruitment process.

The disclosed recruitment system may enable a candidate to capture or create multimedia in a pre-defined format comprising paragraphs, points, from a personal perspective, while enabling the candidate to re-record and review a captured multimedia in one or more segments. The candidate can send the created multimedia/video to a recruiter for review by using the recruitment system.

The disclosed recruitment system is a video-based digital recruitment system that enables the candidates and recruiters to exchange information in form of videos during a recruitment process. The videos may provide a real representation of the candidates and may help the recruiters to comprehensively review the video of the candidate for assessment. The disclosed recruitment system is fast, easy to use and is user friendly. In some embodiments, the recruitment system enables the sending/receiving of the multimedia or videos in real-time. In some embodiments, a user like a candidate or recruiter may create a multimedia or multimedia response using their computing device like a smart phone with video capturing capability, then may upload the video on the recruitment system for further processing or sharing. In some embodiments, the recruitment system may encrypt and/or compress the video without effecting a quality of the video. This may be done to allow for operation of 3G+ mobile networks, in a minimal blocking upload time, while not sacrificing quality.

Further, the recruitment system enables the users like candidates and recruiters to record a video on just single press and review the video by single touch on the computing device. Further, the recruitment system allows the users to edit the videos for an authentic presentation, not a produced one. The videos must show the candidates (or recruiters) in their natural or chosen state and may not enable or allow a third party or post production edit of their video. Further, the recruitment system enables for creation of multi shot video with editing prior to uploading or sending.

The disclosed recruitment system may provide a new communication medium for first impressions in a job application and unsolicited applications, with a core focus on employment, labour hire such as childminding and industrial inspection.

Further, the disclosed recruitment systems may be used for workplace communications. The disclosed recruitment systems may also be used as an effective means of data sharing and communication in other industries than recruitment industry. Further, the disclosed systems may be used for on-site maintenance reporting, and so forth. Though the embodiments of the digital recruitment system have been described with reference to recruitment industry, the systems and methods disclosed in the present disclosure may be used in other markets or industries also requiring effective communication, data sharing, reporting, live communication etc.

The disclosed video-based recruitment systems and methods may provide a base review technique that may replace the need for the preparation and review of cover letters, thus facilitating a more efficient recruitment process suited to a job market geared towards shorter term employment contracts and roles.

The disclosed recruitment systems may allow candidate i.e. job seekers to record, edit, and send a video cover letter or video resume as simply and in a similar, if not better, timeframe as they can create a standard email cover letter using mobile phone or minimum computing capacity.

The disclosed recruitment systems may provide recruiters with an improved and efficient candidate review process, including more points of data and an authentication process reduce the requirement for first candidate screening interviews.

The disclosed recruitment systems may provide candidates with a clear and simple way to create a focused and concise personal video introduction. The recruiter must or may have the same, or better, time commitment to reviews as a traditional email cover letter and CV/resume submission.

The disclosed recruitment systems may provide a common format of data collection and presentation across job and industry requirements.

The disclosed recruitment systems may provide a simplified and efficient candidate review process for the recruiters, that can be scaled and customized to suit needs of the recruiters.

The disclosed recruitment systems are accessible to all candidates or job seekers to cater for minimum specified machines and mobile or computing devices.

The disclosed recruitment systems and methods may improve the outcomes and accuracy in the employment of individuals i.e. candidates or job seekers.

The disclosed recruitment systems and methods may provide online deal brokering or communication that are supported by algorithmic control processes and may be enhanced by value added services.

The disclosed recruitment systems and methods enables delivery of short videos like of 27 seconds videos and text messages that may expire after a certain period of time. The disclosed recruitment system may reside in an application for creating, viewing, and sharing short (approximately 27 second) temporary videos between the recruiters and the candidates. The disclosed recruitment systems may allow inbuilt mutual feedback, productivity improvements, and optimized data management.

The disclosed recruitment systems may solve the modern problem of overloaded and unfocused content by way of a process, method and algorithmic update to social media. The disclosed recruitment systems may provide a user like candidate, with a defined daily, fixed duration and content channel to provide updates on consumer-relevant information. The disclosed recruitment systems provide a communication network where quality is prioritized over quantity. This way, the systems may control content, data management, in turn improving social experience.

The disclosed recruitment systems may enable the candidates and recruiters to communicate in real-time without the need for long review periods, where the recruiters or human resource staff piles over generic CVs and cover letters and make their own judgement calls on which candidate to interview and then pass to management. The disclosed recruitment systems may decrease this review time.

The disclosed recruitment systems may save recruiters' (like employers) and candidates' time in hiring employees whilst providing the recruiters with unique information on the candidates' personalities that may allow the recruiters to better assess the candidates' suitability to their business or company.

The disclosed recruitment systems may enable candidates to communicate in an online social network that currently does not exist.

The disclosed recruitment systems may enable candidates to send videos (multimedia) or text messages to the recruiter(s) while protecting candidate's privacy and ownership. In some embodiments, the video is of a pre-defined duration. Further, in some embodiments, the video is a temporary video, hence the receiver of the video may be able to see or review the video for a pre-defined time only and may not be able to access the video (or text messages) after the pre-defined time lapses.

Further, in some embodiments, the candidate creates the video in one or more sections. The disclosed digital recruitment system may allow the candidate to edit, review, re-record, combine the one or more sections in any order. The candidate may also edit individual sections or may combine them into one single video and then can edit the combined video.

The disclosed recruitment systems and methods may further provide a live-in person service marketplace by facilitating a negotiation and bidding process, in person, where the personality and alternate offers can be personally presented, much like a live interview or marketplace negotiation.

The disclosed recruitment systems and methods may offer significant improvements to the recruitment process and resulting industry. IT is expected to result in better cultural fit and more points of data for accurate and informed selection required to make better hiring decisions and the resulting increases in associated commercial productivity.

In some embodiments, the disclosed video-based recruitment system may also facilitate the visual inspection and on-site reporting requirement, inclusion of precise location mapping, augmented visual capture assistance and capability to cope with unstable or offline network operation. This may particularly be applicable in areas such as offshore hydrocarbon extraction. This may allow it to become a visual reporting tool in an area where manual inspection is the norm and therefore help overcome the problem of bad quality data in these settings. Further, the disclosed video-based recruitment systems include a visual guide for the manner in which multimedia or video may be made, a visual instruction set to ensure that a variety of end users may undertake inspections safely and are able to use the system with ease. This way the system may facilitate accurate corrosion analysis, wear monitoring, damage identification such as from impact or component failure. The rapid capture and distribution of videos offered by the disclosed recruitment systems may offer potential to significantly increase response times, repair times, and asset operational life.

The disclosed video-based recruitment systems may be used in the companies by an employer, a hiring manager, a recruiter for improving and expediting the recruitment process and by the candidates for applying for one or more jobs opportunities. Also, the disclosed video-based digital recruitment systems may be used for improving the hiring process of hiring service labour for tasks such as, but not limited to pet walking, or childminding. Further, disclosed video-based recruitment systems may be used in industrial inspection settings so as to allow improved feedback and identification of faults areas needing improvement.

It will be understood that the devices and the databases referred to in the previous sections are not necessarily utilized together method or system of the embodiments. Rather, these devices are merely exemplary of the various devices that may be implemented within a computing device or the server device, and can be implemented in exemplary another device, and other devices as appropriate, that can communicate via a network to the exemplary server device.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. A digital recruitment system for enabling a plurality of candidates to share information with one or more recruiters in a recruitment process, comprising:
    a display device configured to present a user interface to a plurality of users, the plurality of users comprising the plurality of candidates and the one or more recruiters, the user interface comprising a job seeker interface and a recruiter interface, wherein the plurality of candidates is presented with the job seeker interface and the one or more recruiters are presented with the recruiter interface;
    a registration device configured to enable the plurality of users to register with the recruitment system, wherein the one or more recruiters posts one or more job opportunities through at least one of the recruiter interface and one or more job publishing platforms, wherein the plurality of candidates searches and applies for the one or more job opportunities through the job seeker interface;
    a multimedia device configured to:
        enable a candidate of the plurality of candidates to create a job application comprising at least one multimedia, the at least one multimedia comprising one or more sections for applying to at least one job opportunity, wherein the candidate creates the job application by at least one of creating and attaching an information file, recording, reviewing, editing, re-recording, and combining the one or more sections, the one or more sections comprising at least one of a video, an audio, an image, a text message, a live chat message, an automatic message, and the information file;
        enable a recruiter to create at least one multimedia response to the job application, the at least one multimedia response comprising at least one section for interacting with the candidate by at least one of recording, reviewing, editing, re-recording, and combining the at least one section, the at least one section comprising at least one of a video, an audio, an image, an automatic message, a live chat message, a text message, and an information file;
        protect the job application and the at least one multimedia response from editing by a third person other than an owner, wherein the candidate is the owner of the job application and the recruiter is the owner of the at least one multimedia response; and automatically embed, into the at least one multimedia, identifying information of the candidate so that the recruiter can verify authenticity of the at least one multimedia as originating from the candidate, the identifying information of the candidate comprising at least one of: a location of the candidate, and a timestamp of creation of the at least one multimedia; and a communication device configured to facilitate communication between the candidate and the recruiter by:

allowing the candidate to send, via the job seeker interface, the job application to the recruiter, wherein the display device displays, via the recruiter interface, the job application along with augmented data, wherein the recruiter reviews, via the recruiter interface, the job application and the augmented data; and enabling the candidate to receive the at least one multimedia response from the recruiter, wherein the recruiter sends the at least one multimedia response to assess the candidate based on the job application during a recruitment process.

2. The digital recruitment system of claim 1, further comprising a search device configured to:

enable, through the job seeker interface, the plurality of candidates to perform an augmented screen-based search for the one or more job opportunities based on a location, an image, a live camera feed, and a video; and enable, through the recruiter interface, the one or more recruiters to perform an augmented screen-based search for at least one candidate suitable for the one or more job opportunities based on a location, an image, a live camera feed, and a video.

3. The digital recruitment system of claim 1, wherein the multimedia device is further configured to:

perform sentiment analysis on the at least one multimedia to determine when the candidate is interested in the one or more job opportunities;

perform the sentiment analysis on the at least one multimedia response to determine when the recruiter is interested in the job application;

provide, based on the sentiment analysis, a first feedback about the job application to the recruiter, the first feedback comprising notifying the recruiter that the candidate is interested in the one or more job opportunities;

provide, based on the sentiment analysis, a second feedback about the at least one multimedia response to the candidate, the second feedback comprising notifying the candidate that the recruiter is interested in the job application;

enable the candidate to process the at least one multimedia according to one or more pre-defined conditions defined by at least one of the recruiter and the one or more job publishing platforms;

enable the candidate to create the at least one multimedia by recording, reviewing, and editing the multimedia prior to uploading or sending the at least one multimedia; and enable the recruiter to create the at least one multimedia response by recording, reviewing, and editing the at least one multimedia response prior to uploading or sending the at least one multimedia response, wherein the sentiment analysis comprises automatically analyzing facial expressions of the candidate or recruiter to determine interest.

4. The digital recruitment system of claim 1, further comprising:

an integration device configured to integrate the digital recruitment system with the one or more job publishing platforms to enable the plurality of users to access the one or more job publishing platforms directly through the digital recruitment system.

5. The digital recruitment system of claim 1, further comprising:

a first computing device configured to enable the candidate to access the digital recruitment system; and a second computing device configured to enable the recruiter to access the digital recruitment system.

6. The digital recruitment system of claim 1, wherein the job application comprises a personal job application video, the job application video comprising at least one of curriculum vitae (CV) information of the candidate, cover letter information of the candidate, an interview, and negotiation information, wherein the job application and the at least one multimedia response are stored and available for viewing and processing for a pre-defined time, wherein the at least one multimedia and the at least one multimedia response are temporary and expire after the pre-defined time, wherein the cover letter information comprises a video cover letter and is uneditable by any person other than the candidate, wherein the job application comprising the cover letter includes at least one of a timestamp and location information.

7. The digital recruitment system of claim 1, wherein the display device is further configured to:

display the job application on the recruiter interface, the recruiter interface comprising at least three sections comprising:

a multimedia section for displaying the received job application, a live messaging section for allowing live communication between the recruiter and the candidate, and a notes section for allowing the recruiter to write notes based on the review of the job application of the candidate, wherein the recruiter interface further comprises (i) a shortlists section to allow the recruiter to shortlist one or more candidates for the job opportunities, and (ii) one or more action options to allow the recruiter to take one or more action based on the review of the job application; and provide one or more communication options to the recruiter for communicating with the plurality of candidates who applied to the one or more job opportunities, the one or more communication options comprising an automate option and a broadcast option, wherein the automate option allows the recruiter to send one or more messages to a selected list of candidates, wherein the broadcast option allows the recruiter to broadcast a message to the plurality of candidates.

8. The digital recruitment system of claim 1, further comprising:

a database configured to store a visual guide comprising one or more instructions for using the digital recruitment system and for creating and sharing the multimedia, registration information, candidates' information, recruiters' information, job opportunities' information, the one or more sections, the at least one section, the job applications comprising the multimedia, shortlisted job applications, and multimedia responses.

9. The digital recruitment system of claim 1, wherein the registration device is further configured to authenticate at least one of an identity and a location of the plurality of candidates and the one or more recruiters registered with the digital recruitment system.

10. The digital recruitment system of claim 7, wherein the communication device is configured to:
send the one or more messages to at least one of the selected candidates and the plurality of candidates, the sending based on the recruiter selecting at least one of the automate option and the broadcast option; and
when the candidate initiates a job application process through the job seeker interface, automatically initiate a conversation with the candidate by asking pre-defined questions set by the recruiter for the plurality of candidates in accordance with the job opportunity.

11. The digital recruitment system of claim 1, wherein the multimedia device is further configured to:
automatically embed, into the at least one multimedia response, identifying information of the recruiter, the identifying information of the recruiter comprising at least one of: a location of the recruiter, and a timestamp of creation of the at least one multimedia response.

12. The digital recruitment system of claim 1, wherein the protecting the job application and the at least one multimedia response from editing further comprises:
adding one or more security measures to the job application to prevent unauthorized access to the job application;
adding one or more permission settings to the job application to enable the candidate to allow individuals other than the recruiter to view the job application.

13. The digital recruitment system of claim 12, wherein the one or more security measures comprises a password.

14. A method for enabling a plurality of candidates to share information with one or more recruiters in a recruitment process, the method comprising:
presenting, by a display device, a user interface to a plurality of users comprising the plurality of candidates and the one or more recruiters, the user interface comprising a job seeker interface and a recruiter interface, wherein the plurality of candidates is presented with the job seeker interface and the one or more recruiters are presented with the recruiter interface;
enabling, by a registration device of a digital recruitment system, the plurality of users to register with the digital recruitment system, wherein the one or more recruiters posts one or more job opportunities through at least one of the recruiter interface and one or more job publishing platforms, wherein the plurality of candidates applies for the one or more job opportunities through the job seeker interface;
enabling, by a multimedia device of the digital recruitment system, a candidate of the plurality of candidates to create a job application comprising at least one multimedia, the at least one multimedia comprising one or more sections for applying to at least one job opportunity, wherein the candidate creates the job application by at least one of creating and attaching an information file, recording, reviewing, editing, re-recording, and combining the one or more sections, the one or more sections comprising at least one of a video, an audio, an image, a text message, a live chat message, an automatic message, and the information file;
enabling, by the multimedia device, a recruiter to create at least one multimedia response to the job application, the at least one multimedia response comprising at least one section for interacting with the candidate, wherein the recruiter creates the at least one multimedia response by at least one of recording, reviewing, editing, re-recording, and combining the at least one section, the at least one section comprising at least one of a video, an audio, an image, an automatic message, a live chat message, a text message, and an information file;
protecting, by the multimedia device, the job application and the at least one multimedia response from editing by a third person other than an owner, wherein the candidate is the owner of the job application and the recruiter is the owner of the at least one multimedia response;
automatically embed, by the multimedia device, into the at least one multimedia identifying information of the candidate so that the recruiter can verify authenticity of the at least one multimedia as originating from the candidate, the identifying information of the candidate comprising at least one of: a location of the candidate, and a timestamp of creation of the at least one multimedia; and
facilitating, by a communication device of the digital recruitment system, communication between the candidate and the recruiter by:
allowing the candidate to send, via the job seeker interface, the job application to the recruiter, wherein the recruiter interface is configured to display the job application along with augmented data, wherein the recruiter reviews, via the recruiter interface, the job application and the augmented data; and
enabling the candidate to receive, on a first computing device, the at least one multimedia response from the recruiter, wherein the recruiter sends the at least one multimedia response to assess the candidate based on the job application during a recruitment process.

15. The method of claim 14 further comprising:
enabling, by a search device displaying the job seeker interface, the plurality of candidates to perform an augmented screen-based search for the one or more job opportunities based on a location, an image, a live camera feed, and a video; and
enabling, by a search device displaying the recruiter interface, the one or more recruiters to perform an augmented screen-based search for at least one candidate suitable for the one or more job opportunities based on a location, an image, a live camera feed, and a video.

16. The method of claim 14, further comprising:
performing, by the multimedia device, sentiment analysis on the at least one multimedia to determine when the candidate is interested in the one or more job opportunities;
performing, by the multimedia device, sentiment analysis on the at least one multimedia response to determine when the recruiter is interested in the job application;
providing, by the multimedia device and based on the sentiment analysis, a first feedback about the job application to the recruiter, the first feedback comprising notifying the recruiter that the candidate is interested in the one or more job opportunities;
providing, by the multimedia device and based on the sentiment analysis, a second feedback about the at least one multimedia response to the candidate, the second feedback comprising notifying the candidate that the recruiter is interested in the job application;

enabling, by the multimedia device, the candidate to process the at least one multimedia according to one or more pre-defined conditions defined by at least one of the recruiter and the one or more job publishing platforms;

enabling, by the multimedia device, the candidate to create the multimedia by recording, reviewing, and editing the multimedia prior to uploading or sending the multimedia; and enabling, by the multimedia device, the recruiter to create the at least one multimedia response by recording, reviewing, and editing the at least one multimedia response prior to uploading or sending the at least one multimedia response, wherein the sentiment analysis comprises automatically analyzing facial expressions of the candidate or recruiter to determine interest.

17. The method of claim 14, further comprising:
integrating, by an integration device, the digital recruitment system with the one or more job publishing platforms to enable the plurality of users to access the one or more job publishing platforms directly through the digital recruitment system.

18. The method of claim 14, wherein the candidate accesses the digital recruitment system on the first computing device, wherein the recruiter accesses the digital recruitment system on a second computing device.

19. The method of claim 14, wherein the job application comprises a personal job application video, the job application video comprising at least one of curriculum vitae (CV) information of the candidate, cover letter information of the candidate, an interview, and negotiation information, wherein the job application and the at least one multimedia response are stored and are available for viewing and processing for a pre-defined time, wherein the at least one multimedia and the at least one multimedia response are temporary and expire after the pre-defined time.

20. The method of claim 14, further comprising:
displaying, by the display device, the job application on the recruiter interface, the recruiter interface comprising at least three sections comprising:
a multimedia section for displaying the received job application,
a live messaging section for allowing live communication between the recruiter and the candidate, and
a notes section for allowing the recruiter to write notes based on the review of the job application of the candidate,
wherein the recruiter interface further comprises (i) a shortlists section to allow the recruiter to shortlist one or more candidates for the job opportunities, and (ii) one or more action options to allow the recruiter to take one or more action based on the review of the job application; and providing, by the display device, one or more communication options to the recruiter for communicating with the plurality of candidates who applied with the one or more job opportunities, the one or more communication options comprising an automate option and a broadcast option, wherein the automate option allows the recruiter to send one or more messages to a selected list of candidates, wherein the broadcast option allows the recruiter to broadcast a message to the plurality of candidates.

21. The method of claim 14, further comprising:
storing, in a database of the digital recruitment system, a visual guide comprising one or more instructions for using the digital recruitment system and for creating and sharing the multimedia, registration information, candidates' information, recruiters' information, job opportunities' information, the one or more sections, the at least one section, the job applications comprising the multimedia, shortlisted job applications, and multimedia responses.

22. The method of claim 14, further comprising:
authenticating, by the registration device, at least one of an identity and a location of the plurality of candidates and the one or more recruiters registered with the digital recruitment system.

23. The method of claim 14, further comprising:
sending, by the communication device, the one or more messages to at least one of the selected candidates and the plurality of candidates, the sending based on the recruiter selecting at least one of the automate option and the broadcast option; and
when the candidate initiates a job application process through the job seeker interface, automatically initiating, by the communication device, a conversation with the candidate by asking pre-defined questions set by the recruiter for the plurality of candidates in accordance with the job opportunity.

24. A video-based digital recruitment system for enabling a plurality of candidates to share information and interact with one or more recruiters in a recruitment process, comprising:
a display device configured to present a user interface to a plurality of users, the plurality of users comprising the plurality of candidates and the one or more recruiters, the user interface comprising a job seeker interface and a recruiter interface, wherein the plurality of candidates is presented with the job seeker interface and the one or more recruiters are presented with the recruiter interface;
a registration device configured to enable the plurality of users to register with the recruitment system, wherein the one or more recruiters posts one or more job opportunities through at least one of the recruiter interface and one or more job publishing platforms, wherein the plurality of candidates searches and applies for the one or more job opportunities through the job seeker interface;
a multimedia device configured to:
enable a candidate of the plurality of candidates to create a job application comprising at least one multimedia, the at least one multimedia comprising one or more sections for applying to at least one job opportunity, wherein the candidate creates the job application on a first computing device by at least one of creating and attaching an information file, recording, reviewing, editing, re-recording, and combining the one or more sections, the one or more sections comprising at least one of a video, an audio, an image, a text message, a live chat message, an automatic message, and the information file, wherein the job application comprises a personal job application video, an interview video, text messages, audio, negotiation video, cover letter (CV) information, CV information of a pre-defined duration;
enable a recruiter to create, on a second computing device, at least one multimedia response to the job application, the at least one multimedia response being of a pre-defined duration and comprising at least one section for interacting with the candidate by at least one of recording, reviewing, editing, re-recording, and combining the at least one section, the at least one section comprising at least one of a video, an audio, an image, an automatic message, a live chat message, a text message, and an information file; and protect the job application and the at least one multimedia response from editing by a third person other than an owner, wherein the candidate is the owner of the job application and the recruiter is the owner of the at least one multimedia response; and automatically embed, into the at least one multimedia, identifying information of the candidate so that the recruiter can verify authenticity of the at least one multimedia as originating from the candidate, the identifying information of the candidate comprising at least one of: a location of the candidate, and a timestamp of creation of the at least one multimedia;

a communication device configured to facilitate communication between the candidate and the recruiter by:
allowing the candidate to send, via the job seeker interface, the job application to the recruiter, wherein the display device displays, via the recruiter interface, the job application along with augmented data, wherein the recruiter reviews, via the recruiter interface, the job application and the augmented data; and
enabling the candidate to receive the at least one multimedia response from the recruiter, wherein the recruiter sends the at least one multimedia response to assess the candidate based on the job application during a recruitment process;

a search device configured to:
enable the plurality of candidates to perform, via the job seeker interface, an augmented screen-based search for the one or more job opportunities based on a location, an image, a live camera feed, and a video; and
enable the one or more recruiter to perform, via the recruiter interface, an augmented screen-based search for at least one candidate suitable for the one or more job opportunities based on a location, an image, a live camera feed, and a video;

an integration device configured to integrate the recruitment system with the one or more job publishing platforms to enable the plurality of users to access the one or more job publishing platforms directly through the video-based digital recruitment system; and a database configured to store a visual guide comprising one or more instructions for using the digital recruitment system and for creating and sharing the multimedia, registration information, candidates' information, recruiters' information, job opportunities' information, the one or more sections, the at least one section, the job applications comprising the multimedia, shortlisted job applications, and multimedia responses.

25. A non-transitory computer-readable storage medium having instructions stored thereon that, when executed by a computing device, cause the computing device to perform operations to enable a plurality of candidates to share information with one or more recruiters in a recruitment process, the operations comprising:

presenting, by a display device, a user interface to a plurality of users, the plurality of users comprising the plurality of candidates and the one or more recruiters, the user interface comprising a job seeker interface and a recruiter interface, wherein the plurality of candidates is presented with the job seeker interface and the one or more recruiters are presented with the recruiter interface;

enabling, by a registration device of a digital recruitment system, the plurality of users to register with the digital recruitment system, wherein the one or more recruiters posts one or more job opportunities through at least one of the recruiter interface and one or more job publishing platforms, wherein the plurality of candidates applies for the one or more job opportunities through the job seeker interface;

enabling, by a multimedia device of the digital recruitment system, a candidate of the plurality of candidates to create a job application comprising at least one multimedia, the at least one multimedia comprising one or more sections for applying to at least one job opportunity, wherein the candidate creates the job application by at least one of creating and attaching an information file, recording, reviewing, editing, re-recording, and combining the one or more sections, the one or more sections comprising at least one of a video, an audio, an image, a text message, a live chat message, an automatic message, and the information file;

enabling, by the multimedia device, a recruiter to create at least one multimedia response to the job application, the at least one multimedia response comprising at least one section for interacting with the candidate, wherein the recruiter creates the at least one multimedia response by at least one of recording, reviewing, editing, re-recording, and combining the at least one section, the at least one section comprising at least one of a video, an audio, an image, an automatic message, a live chat message, a text message, and an information file;

allowing the candidate to send, via the job seeker interface, the job application to the recruiter, wherein the recruiter interface is configured to display the job application along with augmented data, wherein the recruiter reviews, via the recruiter interface, the job application and the augmented data;

enabling the candidate to receive, on a first computing device, the at least one multimedia response from the recruiter, wherein the recruiter sends the at least one multimedia response to assess the candidate based on the job application during a recruitment process;

protecting, by the multimedia device, the job application and the at least one multimedia response from editing by a third person other than an owner, wherein the candidate is the owner of the job application and the recruiter is the owner of the at least one multimedia response;

automatically embed, by the multimedia device, into the at least one multimedia identifying information of the candidate so that the recruiter can verify authenticity of the at least one multimedia as originating from the candidate, the identifying information of the candidate comprising at least one of: a location of the candidate, and a timestamp of creation of the at least one multimedia;

enabling, by a search device displaying the job seeker interface, the plurality of candidates to perform an augmented screen-based search for the one or more job opportunities based on a location, an image, a live camera feed, and a video; and enabling, by a search device displaying the recruiter interface, the one or more recruiter to perform an augmented screen-based search for at least one candidate suitable for the one or more job opportunities based on a location, an image, a live camera feed, and a video.

* * * * *